US008271036B2

(12) United States Patent
Griffin et al.

(10) Patent No.: US 8,271,036 B2
(45) Date of Patent: *Sep. 18, 2012

(54) HANDHELD WIRELESS COMMUNICATION DEVICE

(75) Inventors: Jason T. Griffin, Kitchener (CA); Steven Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 814 days.

This patent is subject to a terminal disclaimer.

(21) Appl. No.: 11/672,016

(22) Filed: Feb. 6, 2007

(65) Prior Publication Data

US 2007/0254702 A1 Nov. 1, 2007

Related U.S. Application Data

(63) Continuation-in-part of application No. 11/618,500, filed on Dec. 29, 2006, which is a continuation-in-part of application No. 11/423,837, filed on Jun. 13, 2006, application No. 11/672,016, which is a continuation-in-part of application No. 11/423,740, filed on Jun. 13, 2006, and a continuation-in-part of application No. 11/308,436, filed on Mar. 24, 2006, and a continuation-in-part of application No. 10/872,983, filed on Jun. 21, 2004, now Pat. No. 7,561,685.

(60) Provisional application No. 60/773,145, filed on Feb. 13, 2006, provisional application No. 60/773,798, filed on Feb. 14, 2006, provisional application No. 60/773,799, filed on Feb. 14, 2006, provisional application No. 60/773,800, filed on Feb. 14, 2006.

(51) Int. Cl.
*H04M 1/00* (2006.01)

(52) U.S. Cl. ............... 455/556.2; 455/550.1; 455/556.1; 455/168.1

(58) Field of Classification Search ............... 455/556.2, 455/550.1, 556.1, 168; 345/168–69
See application file for complete search history.

(56) References Cited

U.S. PATENT DOCUMENTS 3,633,724 A 1/1972 Samuel
(Continued)

FOREIGN PATENT DOCUMENTS

CN 1292517 4/2001
(Continued)

OTHER PUBLICATIONS

"Dell stellt neue PDA-Topklasse vor" (HEISE) Dec. 12, 2004, retrieved on Mar. 11, 2008 from http://www.heise.de/newsticker/suche/ergebnis?rm+result;q=AXIM%20X50;url=/newsticker/meldung/52069/;words=Axim%20x50%20X50*/***.

(Continued)

*Primary Examiner* — Steve D Agosta
(74) *Attorney, Agent, or Firm* — Novak Druce + Quigg LLP

(57) ABSTRACT

A handheld wireless communication device configured to be hand cradleable by an operator during text entry. A display, key field and trackball navigation tool are located on a front face of the device. At least some keys of the key field are arranged in key-columns and each of the key-columns is vertically offset from adjacent key-columns. Alphanumeric input keys include several alphabetic keys with letters arranged in a traditional (QWERTY), but non-ITU Standard E.161 telephone letter layout. A microprocessor is provided that receives operator commands from the keys and the trackball navigation tool and which affects corresponding changes to the display based on user input. The elongate body is longer than wide and the display 322, key field 650 and the trackball navigational tool 328 are located in consecutive series along the length of the elongate body.

26 Claims, 24 Drawing Sheets

U.S. PATENT DOCUMENTS

| | | | |
|---|---|---|---|
| 3,967,273 A | 6/1976 | Knowlton | |
| 4,029,915 A | 6/1977 | Ojima | |
| 4,449,839 A | 5/1984 | Bleuer | |
| D278,341 S | 4/1985 | Scheid | |
| 4,680,577 A | 7/1987 | Straayer | |
| D293,241 S | 12/1987 | Wan | |
| D312,628 S | 12/1990 | Yokoi | |
| D313,401 S | 1/1991 | Tanabe | |
| D313,413 S | 1/1991 | Langton | |
| 5,059,048 A | 10/1991 | Sirkin | |
| 5,184,830 A | 2/1993 | Okada | |
| 5,217,295 A | 6/1993 | Tortola | |
| 5,288,158 A | 2/1994 | Matias | |
| 5,319,582 A | 6/1994 | Ma | |
| 5,336,001 A | 8/1994 | Lichtenberg | |
| 5,337,346 A | 8/1994 | Uchikura | |
| 5,360,280 A | 11/1994 | Camacho | |
| 5,367,298 A | 11/1994 | Axthelm | |
| D357,253 S | 4/1995 | Wong | |
| 5,410,141 A | 4/1995 | Koenck | |
| 5,410,333 A | 4/1995 | Conway | |
| 5,426,449 A | 6/1995 | Danziger | |
| D359,920 S | 7/1995 | Sakamoto | |
| 5,436,954 A | 7/1995 | Nishiyama | |
| 5,457,454 A | 10/1995 | Sugano | |
| D367,043 S | 2/1996 | Ross | |
| 5,500,643 A | 3/1996 | Grant | |
| 5,521,590 A | 5/1996 | Hanaoka | |
| 5,598,469 A | 1/1997 | Preker | |
| D381,021 S | 7/1997 | Williams | |
| D383,756 S | 9/1997 | Henderson | |
| D386,497 S | 11/1997 | Huslig | |
| D390,509 S | 2/1998 | Antzinas | |
| 5,729,221 A | 3/1998 | Kroiopp | |
| 5,764,474 A | 6/1998 | Youens | |
| 5,774,540 A | 6/1998 | Davidson | |
| 5,786,776 A | 7/1998 | Kisaichi | |
| D397,369 S | 8/1998 | Rissman | |
| D397,728 S | 9/1998 | Yuen | |
| D399,537 S | 10/1998 | Chi | |
| 5,818,437 A | 10/1998 | Grover | |
| 5,825,353 A | 10/1998 | Will | |
| 5,827,082 A | 10/1998 | Laine | |
| 5,841,374 A | 11/1998 | Abraham | |
| D402,572 S | 12/1998 | Han | |
| D403,362 S | 12/1998 | Fai | |
| 5,861,821 A | 1/1999 | Kato | |
| 5,889,507 A | 3/1999 | Engle | |
| 5,893,798 A | 4/1999 | Stambolic | |
| 5,903,259 A | 5/1999 | Brusky et al. | |
| 5,914,702 A | 6/1999 | Derocher | |
| 5,915,228 A | 6/1999 | Kunihiro | |
| 5,920,308 A | 7/1999 | Kim | |
| 5,931,873 A | 8/1999 | Cisar | |
| 5,953,541 A | 9/1999 | King | |
| 5,963,197 A | 10/1999 | Bacon | |
| 5,974,238 A | 10/1999 | Chase | |
| D416,256 S | 11/1999 | Griffin | |
| 5,982,520 A | 11/1999 | Weiser | |
| 5,995,026 A | 11/1999 | Sellers | |
| 6,005,496 A | 12/1999 | Hargreaves | |
| 6,006,351 A | 12/1999 | Peretz | |
| 6,009,333 A | 12/1999 | Chaco | |
| 6,011,554 A | 1/2000 | King | |
| 6,014,429 A | 1/2000 | LaPorta | |
| 6,014,573 A | 1/2000 | Lehtonen | |
| D420,351 S | 2/2000 | Waldner | |
| 6,023,779 A | 2/2000 | Fullam | |
| 6,043,761 A | 3/2000 | Burrell | |
| 6,047,047 A | 4/2000 | Aldridge | |
| 6,047,196 A | 4/2000 | Makela | |
| 6,049,796 A | 4/2000 | Siltonen | |
| 6,052,070 A | 4/2000 | Kivela | |
| 6,061,576 A | 5/2000 | Terrasson | |
| 6,084,576 A | 7/2000 | Leu | |
| 6,091,596 A | 7/2000 | Godfrey | |
| 6,094,197 A | 7/2000 | Buxton | |
| 6,097,371 A | 8/2000 | Siddiqui | |
| 6,102,594 A | 8/2000 | Strom | |
| 6,103,979 A | 8/2000 | Motoyama | |
| 6,107,997 A | 8/2000 | Ure | |
| D432,511 S | 10/2000 | Eckholm | |
| D433,017 S | 10/2000 | Martinez | |
| D433,460 S | 11/2000 | Griffin | |
| 6,148,261 A | 11/2000 | Obradovich | |
| 6,150,962 A | 11/2000 | Rossmann | |
| 6,157,323 A | 12/2000 | Tso | |
| D436,591 S | 1/2001 | Abston | |
| 6,212,412 B1 | 4/2001 | Rogers | |
| D441,733 S | 5/2001 | Do | |
| 6,243,789 B1 | 6/2001 | Hasbun | |
| 6,259,044 B1 | 7/2001 | Paratore | |
| 6,278,442 B1 | 8/2001 | Griffin | |
| 6,286,064 B1 | 9/2001 | King | |
| 6,295,052 B1 | 9/2001 | Kato | |
| 6,297,795 B1 | 10/2001 | Kato | |
| 6,304,261 B1 | 10/2001 | Shields | |
| 6,304,431 B1 | 10/2001 | Kim | |
| 6,307,548 B1 | 10/2001 | Flinchem | |
| 6,307,549 B1 | 10/2001 | King | |
| 6,310,609 B1 | 10/2001 | Morgenthaler | |
| D451,079 S | 11/2001 | Ali | |
| 6,333,734 B1 | 12/2001 | Rein | |
| D454,349 S | 3/2002 | Makidera | |
| D454,849 S | 3/2002 | Eckholm | |
| 6,356,258 B1 | 3/2002 | Kato | |
| 6,374,277 B2 | 4/2002 | Vong | |
| D456,794 S | 5/2002 | Laverick | |
| 6,385,463 B1 | 5/2002 | Lieberman | |
| 6,396,482 B1 | 5/2002 | Griffin | |
| D458,239 S | 6/2002 | Shim | |
| D459,327 S | 6/2002 | Ali | |
| D460,068 S | 7/2002 | Lanzaro | |
| D460,493 S | 7/2002 | Griffin | |
| D461,803 S | 8/2002 | Griffin | |
| 6,452,588 B2 | 9/2002 | Griffin | |
| D464,995 S | 10/2002 | Griffin | |
| 6,459,968 B1 | 10/2002 | Kochie | |
| 6,480,185 B1* | 11/2002 | Kiljander et al. | 345/167 |
| 6,487,396 B1* | 11/2002 | Sassi | 455/90.1 |
| 6,489,950 B1 | 12/2002 | Griffin | |
| 6,507,336 B1 | 1/2003 | Lunsford | |
| D469,749 S | 2/2003 | Kim | |
| D472,225 S | 3/2003 | Griffin | |
| 6,535,749 B1 | 3/2003 | Iwata | |
| 6,538,651 B1 | 3/2003 | Hayman | |
| D472,551 S | 4/2003 | Griffin | |
| D473,226 S | 4/2003 | Griffin | |
| D476,985 S | 7/2003 | Griffin | |
| D478,585 S | 8/2003 | Griffin | |
| 6,611,254 B1 | 8/2003 | Griffin | |
| D479,233 S | 9/2003 | Griffin | |
| 6,630,924 B1 | 10/2003 | Peck | |
| 6,647,367 B2 | 11/2003 | McArthur | |
| 6,810,271 B1 | 10/2004 | Wood | |
| 6,813,509 B2 | 11/2004 | Aquilar et al. | |
| 6,957,397 B1 | 10/2005 | Hawkins | |
| 6,959,208 B2 | 10/2005 | Tanaka et al. | |
| 6,993,362 B1 | 1/2006 | Aberg | |
| 7,035,720 B2 | 4/2006 | Taxis | |
| 7,083,342 B2* | 8/2006 | Griffin | 400/485 |
| 7,102,626 B2 | 9/2006 | Denny | |
| 7,133,706 B2 | 11/2006 | Kespohl et al. | |
| 7,177,604 B2 | 2/2007 | Wong et al. | |
| 7,193,613 B2 | 3/2007 | Jam | |
| 7,231,229 B1* | 6/2007 | Hawkins et al. | 455/564 |
| 7,454,713 B2 | 11/2008 | Spalink | |
| 7,456,759 B2 | 11/2008 | Griffin | |
| 7,511,700 B2* | 3/2009 | Skillman | 345/168 |
| 7,532,198 B2* | 5/2009 | Lazaridis et al. | 345/157 |
| 7,552,142 B2 | 6/2009 | Lee | |
| 2001/0006587 A1 | 7/2001 | Keinonen | |
| 2001/0013859 A1 | 8/2001 | Roylance | |
| 2001/0048378 A1 | 12/2001 | Horie | |
| 2002/0142738 A1 | 10/2002 | Jambie et al. | |
| 2002/0149566 A1 | 10/2002 | Sarkissian | |
| 2003/0020692 A1 | 1/2003 | Griffin | |

| | | | |
|---|---|---|---|
| 2003/0032455 | A1 | 2/2003 | Watanabe et al. |
| 2003/0064757 | A1 | 4/2003 | Yamadera et al. |
| 2003/0094354 | A1 | 5/2003 | Badameh |
| 2004/0001105 | A1 | 1/2004 | Chew |
| 2004/0015500 | A1 | 1/2004 | Pugliese |
| 2004/0017354 | A1 | 1/2004 | Muranami |
| 2004/0142720 | A1 | 7/2004 | Smethers |
| 2004/0142738 | A1 | 7/2004 | Anderson et al. |
| 2004/0165924 | A1* | 8/2004 | Griffin ............................ 400/486 |
| 2004/0184896 | A1 | 9/2004 | Tanner |
| 2004/0261031 | A1 | 12/2004 | Tuomainen et al. |
| 2005/0053225 | A1 | 3/2005 | Griffin |
| 2005/0076309 | A1 | 4/2005 | Goldsmith |
| 2005/0140653 | A1 | 6/2005 | Pletikosa |
| 2005/0185788 | A1* | 8/2005 | Daw ............................... 379/369 |
| 2005/0190083 | A1 | 9/2005 | Tyneski |
| 2005/0206620 | A1 | 9/2005 | Oakley |
| 2005/0244208 | A1 | 11/2005 | Suess |
| 2005/0287953 | A1 | 12/2005 | Ikeda |
| 2006/0007129 | A1 | 1/2006 | Pletikosa |
| 2006/0022947 | A1* | 2/2006 | Griffin et al. ................. 345/168 |
| 2006/0026535 | A1 | 2/2006 | Hotelling |
| 2006/0026536 | A1 | 2/2006 | Hotelling |
| 2006/0055789 | A1 | 3/2006 | Jin |
| 2006/0097995 | A1 | 5/2006 | Nagayasu |
| 2006/0164399 | A1 | 7/2006 | Cheston |
| 2006/0218506 | A1 | 9/2006 | Srenger |
| 2006/0253801 | A1 | 11/2006 | Okaro |
| 2006/0270444 | A1 | 11/2006 | Miramontes |
| 2007/0044037 | A1 | 2/2007 | Amari |
| 2007/0174785 | A1 | 7/2007 | Perttula |
| 2007/0254700 | A1 | 11/2007 | Griffin et al. |
| 2007/0254701 | A1 | 11/2007 | Griffin et al. |
| 2007/0254704 | A1 | 11/2007 | Griffin et al. |
| 2007/0268259 | A1 | 11/2007 | Griffin et al. |
| 2007/0281675 | A1* | 12/2007 | Pletikosa et al. .............. 455/418 |
| 2008/0057941 | A1 | 3/2008 | Scott et al. |
| 2008/0057985 | A1 | 3/2008 | Tao |

FOREIGN PATENT DOCUMENTS

| | | |
|---|---|---|
| CN | 101017407 | 8/2007 |
| DE | 19743283 | 2/1999 |
| DE | 19743283 C1 | 2/1999 |
| EP | 0129996 | 1/1985 |
| EP | 0267801 | 5/1988 |
| EP | 0278169 | 8/1988 |
| EP | 0538020 | 4/1993 |
| EP | 0685801 | 12/1995 |
| EP | 0732646 | 9/1996 |
| EP | 0760291 | 3/1997 |
| EP | 0882259 | 12/1998 |
| EP | 0886414 | 12/1998 |
| EP | 0540147 | 6/1999 |
| EP | 1143327 | 10/2001 |
| EP | 1521168 | 4/2005 |
| JP | 59178531 | 10/1984 |
| JP | 08211987 | 8/1996 |
| JP | 9-128148 | 5/1997 |
| JP | 09261758 | 10/1997 |
| JP | 10254894 | 9/1998 |
| JP | 20035857 | 2/2000 |
| JP | 2002251253 | 6/2002 |
| JP | 2002222037 | 8/2002 |
| JP | 2003258977 | 10/2002 |
| JP | 2002297292 | 9/2003 |
| WO | 9833111 | 7/1998 |
| WO | 9844631 | 10/1998 |
| WO | 9937025 | 7/1999 |
| WO | 0030381 | 5/2000 |
| WO | 00/35091 | 6/2000 |
| WO | 0038041 | 6/2000 |
| WO | 0074240 | 12/2000 |
| WO | 0150335 | 7/2001 |
| WO | 0185460 | 7/2001 |
| WO | 0185460 | 11/2001 |
| WO | 02088920 | 11/2002 |
| WO | 03041047 | 5/2003 |
| WO | 2004/086211 | 10/2004 |

OTHER PUBLICATIONS

"Dell(TM) Axim(TM) X50 Owner's Manual" (DELL) Sep. 2004, retrieved on Mar. 11, 2008, from http://support.dell.com/support/edocs/systems/aximx50/en/om/N6966bk1.pdf*.

"Context menu" (Wikipedia) Oct. 8, 2005, retrieved on Mar. 11, 2008 from http://web.archive.org/web/20051008132509/http://en.wikipedia.org/wiki/Context_menu*/**.

IBM Technical Disclosure Bulletin; vol. 18, No. 12, May 1976; pp. 4187-4190.

Toth, Viktor T., "Programmable Calculators: Hewlett-Packard HP-200LX," copyright 2001, 2002, from web pg. at www.rskey.org/hp2001x.htm.

Anonymous: Triangular Toggle Keys for Touch-Tone Phones; IBM Technical Disclosure Bulletin, vol. 31, No. 1, Jun. 1, 1988, pp. 47-49, NY, US.

Advisory Action dated Jul. 7, 2010 in corresponding U.S. Appl. No. 11/672,028.

Advisory Action dated Jul. 6, 2010 in corresponding U.S. Appl. No. 11/672,026.

Non-Final Office Action dated Sep. 15, 2009 in corresponding U.S. Appl. No. 11/672,024.

Final Office Action dated Feb. 26, 2010 in corresponding U.S. Appl. No. 11/672,024.

Non-Final Office Action dated May 25, 2010 in corresponding U.S. Appl. No. 11/672,024.

Non-Final Office Action dated Sep. 15, 2009 in corresponding U.S. Appl. No. 11/672,023.

Final Office Action dated Feb. 24, 2010 in corresponding U.S. Appl. No. 11/672,023.

Non-Final Office Action dated May 25, 2010 in corresponding U.S. Appl. No. 11/672,023.

Non-Final Office Action dated Aug. 13, 2009 in corresponding U.S. Appl. No. 11/672,021.

Final Office Action dated Feb. 9, 2010 in corresponding U.S. Appl. No. 11/672,021.

Advisory Action dated Apr. 20, 2010 in corresponding U.S. Appl. No. 11/672,021.

Non-Final Office Action dated Jun. 1, 2010 in corresponding U.S. Appl. No. 11/672,021.

Final Office Action dated Feb. 1, 2010 in corresponding U.S. Appl. No. 11/672,017.

Advisory Action dated Apr. 9, 2010 in corresponding U.S. Appl. No. 11/672,017.

Non-Final Office Action dated Jun. 1, 2010 in corresponding U.S. Appl. No. 11/672,017.

Non-Final Office Action dated Sep. 3, 2009 in corresponding U.S. Appl. No. 11/672,011.

Final Office Action dated Feb. 24, 2010 in corresponding U.S. Appl. No. 11/672,011.

Non-Final Office Action dated May 25, 2010 in corresponding U.S. Appl. No. 11/672,011.

Non-Final Office Action dated Sep. 2, 2009 in corresponding U.S. Appl. No. 11/672,008.

Final Office Action dated Feb. 17, 2010 in corresponding U.S. Appl. No. 11/672,008.

Non-Final Office Action dated May 7, 2010 in corresponding U.S. Appl. No. 11/672,008.

Non-Final Office Action dated Mar. 12, 2010 in corresponding U.S. Appl. No. 11/672,006.

Non-Final Office Action dated Sep. 24, 2009 in corresponding U.S. Appl. No. 11/672,006.

Non-Final Office Action dated Aug. 17, 2009 in corresponding U.S. Appl. No. 11/672,031.

Final Office Action dated Feb. 17, 2010 in corresponding U.S. Appl. No. 11/672,031.

Non-Final Office Action dated May 6, 2010 in corresponding U.S. Appl. No. 11/672,031.

Non-Final Office Action dated Aug. 17, 2009 in corresponding U.S. Appl. No. 11/671,995.

Final Office Action dated Feb. 1, 2010 in corresponding U.S. Appl. No. 11/671,995.

Advisory Action dated Apr. 7, 2010 in corresponding U.S. Appl. No. 11/671,995.

Non-Final Office Action dated May 7, 2010 in corresponding U.S. Appl. No. 11/671,995.
Non-Final Office Action dated Jul. 20, 2009 in corresponding U.S. Appl. No. 11/671,996.
Non-Final Office Action dated Jan. 8, 2010 in corresponding U.S. Appl. No. 11/671,996.
Final Office Action dated Jul. 1, 2010 in corresponding U.S. Appl. No. 11/671,996.
Non-Final Office Action dated Aug. 7, 2009 in corresponding U.S. Appl. No. 11/672,032.
Final Office Action dated Feb. 1, 2010 in corresponding U.S. Appl. No. 11/672,032.
Advisory Action dated Apr. 7, 2010 in corresponding U.S. Appl. No. 11/672,032.
Non-Final Office Action dated May 6, 2009 in corresponding U.S. Appl. No. 11/672,032.
Non-Final Office Action dated Aug. 7, 2009 in corresponding U.S. Appl. No. 11/671,985.
Final Office Action dated Feb. 1, 2010 in corresponding U.S. Appl. No. 11/671,985.
Advisory Action dated Apr. 7, 2010 in corresponding U.S. Appl. No. 11/671,985.
Non-Final Office Action dated Apr. 30, 2010 in corresponding U.S. Appl. No. 11/671,985.
Non-Final Office Action dated Jul. 22, 2009 in corresponding U.S. Appl. No. 11/671,976.
Final Office Action dated Dec. 10, 2009 in corresponding U.S. Appl. No. 11/671,976.
Advisory Action dated Feb. 23, 2010 in corresponding U.S. Appl. No. 11/671,976.
Non-Final Office Action dated Apr. 15, 2010 in corresponding U.S. Appl. No. 11/671,976.
Non-Final Office Action dated Jul. 21, 2009 in corresponding U.S. Appl. No. 11/671,977.
Final Office Action dated Dec. 28, 2009 in corresponding U.S. Appl. No. 11/671,977.
Non-Final Office Action dated Jun. 11, 2010 in corresponding U.S. Appl. No. 11/671,977.
Advisory Action dated Jul. 6, 2010 in corresponding U.S. Appl. No. 11/671,961.
Non-Final Office Action dated Oct. 23, 2009 in corresponding U.S. Appl. No. 11/672,028.
Final Office Action dated Apr. 23, 2010 in corresponding U.S. Appl. No. 11/672,028.
Non-Final Office Action dated Oct. 27, 2009 in corresponding U.S. Appl. No. 11/671,961.
Final Office Action dated Apr. 23, 2010 in corresponding U.S. Appl. No. 11/671,961.
On-Final Office Action dated Oct. 26, 2009 in corresponding U.S. Appl. No. 11/672,026.
Final Office Action dated Apr. 26, 2010 in corresponding U.S. Appl. No. 11/672,026.
I.S. MacKenzie and R.W. Soukoreff; "Text Entry for Mobile Computing: Models and methods;" Theory and Practice; Human-Computer Interaction, 2002, vol. 17, pp. 147-198; © 2002.
Non-Final office Action dated Aug. 17, 2009 in corresponding U.S. Appl. No. 11/672,017.

* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | | |
| Z | X | C | V | B | N | M | | | | |

*FIG. 9a*

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | |
| Y | X | C | V | B | N | M | | | |

*FIG. 9b*

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | |
| W | X | C | V | B | N | M | | | |

*FIG. 9c*

| 1 | 2 | 3 | 4 | 5 | 6 | 7 | 8 | 9 | 0 |
|---|---|---|---|---|---|---|---|---|---|
| | | P | Y | F | G | C | R | L | |
| A | O | E | U | I | D | H | Y | N | S |
| | Q | J | K | X | B | M | W | V | Z |

*FIG. 9d*

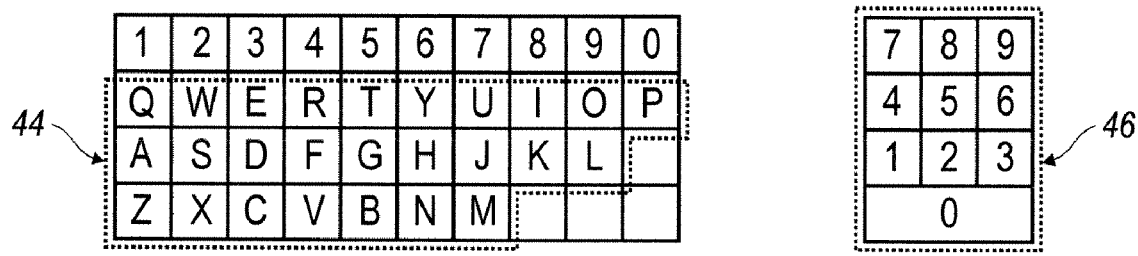
FIG. 10
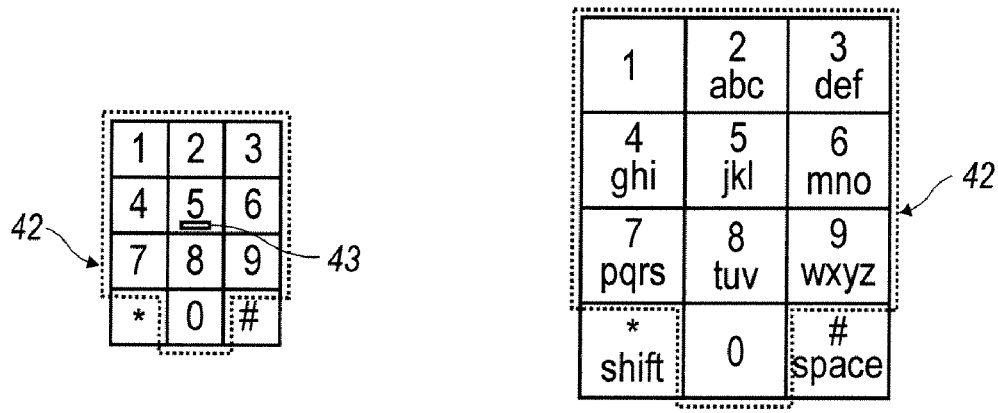
FIG. 11  FIG. 12

HANDHELD WIRELESS COMMUNICATION DEVICE

CROSS REFERENCE TO RELATED APPLICATIONS

The present application is: (i) a continuation-in-part application of U.S. application Ser. No. 11/618,500, filed on Dec. 29, 2006 which is a continuation-in-part application of U.S. application Ser. No. 11/423,837, filed Jun. 13, 2006 and claims the benefit of U.S. Provisional Application Nos. 60/773,145, 60/773,798, 60/773,799, and 60/773,800, filed Feb. 13, 2006, Feb. 14, 2006, Feb. 14, 2006, and Feb. 14, 2006, respectively; (ii) a continuation-in-part application of U.S. application Ser. No. 11/423,740, filed Jun. 13, 2006; (iii) a continuation-in-part application of U.S. application Ser. No. 11/308,436, filed Mar. 24, 2006; and (iv) a continuation-in-part application of U.S. application Ser. No. 10/872,983, filed Jun. 21, 2004 now U.S. Pat. No. 7,561,685. Each of said applications is hereby expressly incorporated herein by reference in their entireties.

FIELD

The present disclosure, in a broad sense, is directed toward handheld electronic devices. More specifically, the disclosure is directed toward handheld communication devices that have wireless communication capabilities and the networks within which the wireless communication devices operate. The present disclosure further relates to the user interfaces of these devices, as well as the software that controls and runs applications on the device.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

A primary focus of the present disclosure is enhanced usability of today's more sophisticated wireless handheld communication devices 300 taking into account the necessary busyness of the front face real estate of these more compact devices that incorporate additional user interfaces.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize all of the keyboard surface as efficiently as possible.

Many keyboards on mobile devices have an input device for navigation through the graphical user interface. These interfaces include such devices as trackballs and rotating wheels which can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

Another keyboard spacing problem is that of finger overlap when keys are smaller than the user's finger and are spaced closely together. Because keys near the center of the keyboard are surrounded by other keys, they are particularly more difficult to press without the user's finger overlapping and inadvertently pressing an adjacent key.

Accordingly, as the demand for small-screen devices capable of running increasingly complex applications continues to grow, the need exists for a way to implement user control interface menus that overcome the various disadvantages with conventional dropdown-style hierarchical menus.

BRIEF DESCRIPTION OF THE DRAWINGS

Exemplary methods and arrangements conducted and configured according to the advantageous solutions presented herein are depicted in the accompanying drawings wherein:

FIG. 9a illustrates an exemplary QWERTY keyboard layout;

FIG. 9b illustrates an exemplary QWERTZ keyboard layout;

FIG. 9c illustrates an exemplary AZERTY keyboard layout;

FIG. 9d illustrates an exemplary Dvorak keyboard layout;

FIG. 10 illustrates a QWERTY keyboard layout paired with a traditional ten-key keyboard;

FIG. 11 illustrates ten digits comprising the numerals 0-9 arranged in a traditional, ITU Standard E.161 numeric telephone keypad layout, including the * and # flanking the zero;

FIG. 12 illustrates a traditional or standard phone key arrangement or layout according to the ITU Standard E.161 including both numerals and letters;

DETAILED DESCRIPTION

Figure 1:
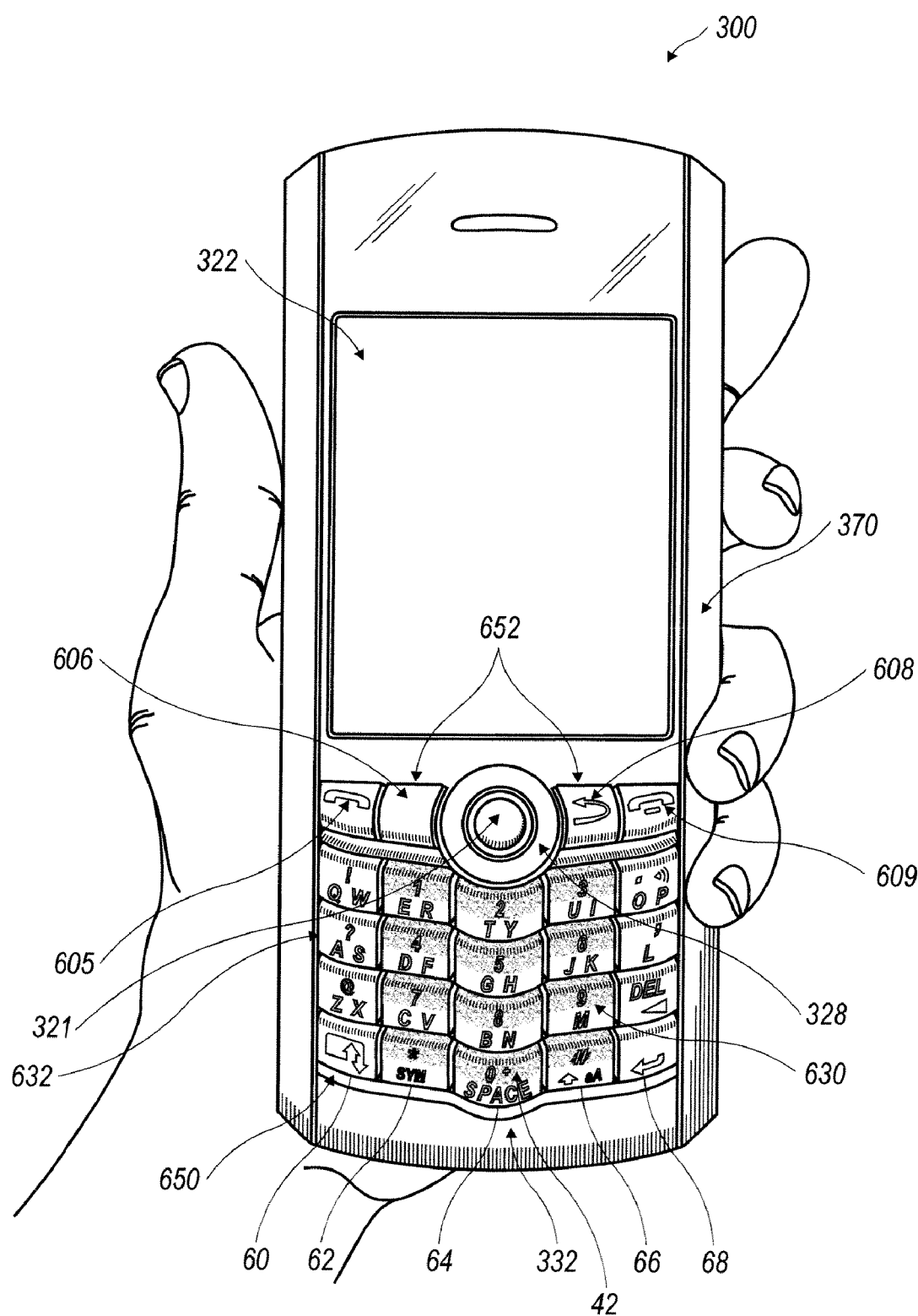
FIG. 1 depicts a handheld communication device configured according to the present teachings cradled in the palm of a user's hand.
Figure 2:
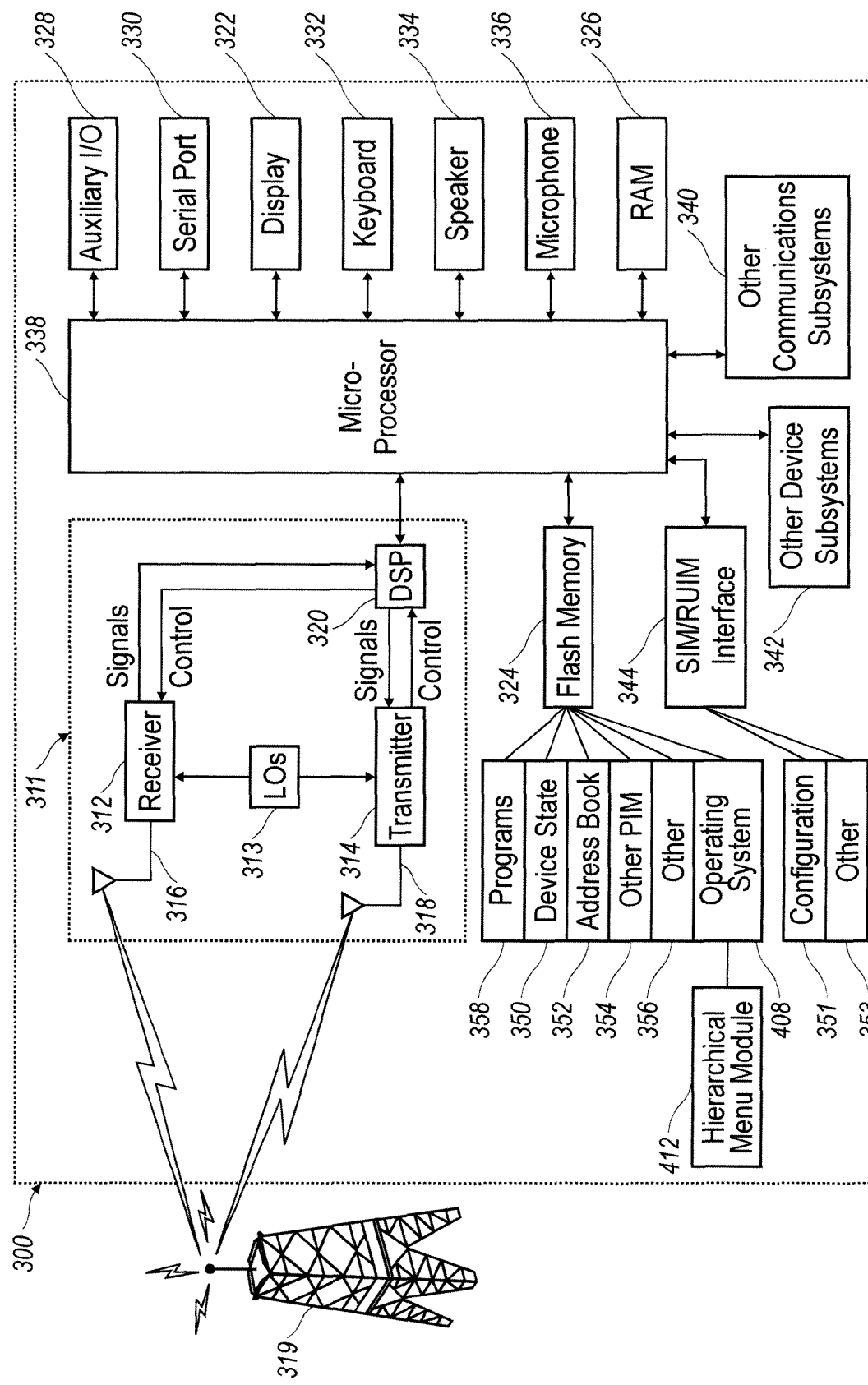
FIG. 2 is a block diagram representing a wireless handheld communication device interacting in a communication network.

An exemplary handheld electronic device 300 such as is shown in FIG. 1 and the device's cooperation in a wireless network 319 is exemplified in the block diagram of FIG. 2. These figures are exemplary only, and those persons skilled in the art will appreciate the additional elements and modifications necessary to make the device 300 work in particular network environments.

The block diagram of FIG. 2 denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or an infrared device and associated circuits and components. Additionally, the microprocessor 338 is able to perform operating system 408 functions and preferably enables execution of software applications on the communication device 300.

The included auxiliary I/O subsystem 328 can take the form of a variety of different navigation tools including a trackball 321 based device, a thumbwheel, a navigation pad, or a joystick, just as examples. These navigation tools are preferably located on the front surface of the device 300 but may be located on any exterior surface of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 suitable for accommodating textual input to the handheld communication device 300 when in an operable configuration. The front face of the device has a keyfield 650 that includes menu keys 652, alphanumeric keys 630, alphabetic keys 632, numeric keys 42, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the ball 321 is depressed like a button. The placement of the trackball 321 is preferably above the keyboard 332 and below the display screen 322; here, it avoids interference during keyboarding and does not block the user's view of the display screen 322 during use.

As illustrated in at least FIG. 1, the present disclosure is directed to a handheld wireless communication device 300 configured to send and receive text messages. The device includes a hand cradleable, body configured to be held in one hand by an operator of the device during text entry. A display 322 is included that is located on a front face 370 of the elongate body and upon which information is displayed to the operator during text entry. A key field 650 is also located on the front face of the elongate body and which comprises a plurality of keys selected from a plurality of alphanumeric input keys 630 and at least one menu key 652. A trackball navigation tool 328 is also located on the front face of the body. The alphanumeric input keys comprise a plurality of alphabetic keys 632 having letters associated therewith and the letters Q, W, E, R and T are arranged in consecutive order in a top row of the alphabetic keys. More generically, the order of the letters of the alphabetic keys 632 on the presently disclosed device can be described as being of a traditional, but non-ITU Standard E.161 layout. This terminology has been utilized to clearly delineate the fact that such a telephone keypad as depicted in FIG. 12 is not suitable for use in the presently disclosed device 300. Moreover, persons skilled in these arts and which design devices 300 of the nature defined herein would not look to devices that include an ITU Standard E.161 alphabetic telephone keypad configuration because of the substantial deficiencies that exist where text input beyond short messaging services (SMS) is required, such as for emailing. A microprocessor 338 is provided internal to the device body that receives operator commands from the alphanumeric input keys 630, the menu keys 652 and the trackball navigation tool 328 and which affects corresponding changes to the display based on user input.

Still referring to FIG. 1, the body has a length greater than a width thereof and the display 322, the key field 650 and the trackball navigational tool 328 are located in series along the length of the body. As shown, each of the display 322, the key field 650 and the trackball navigational tool 328 is substantially width-wise centered on the body. Furthermore, the display 322, the trackball navigational tool 328 and the key field 650 are consecutively ordered along a lengthwise longitudinal-axis of the body.

Figure 22:
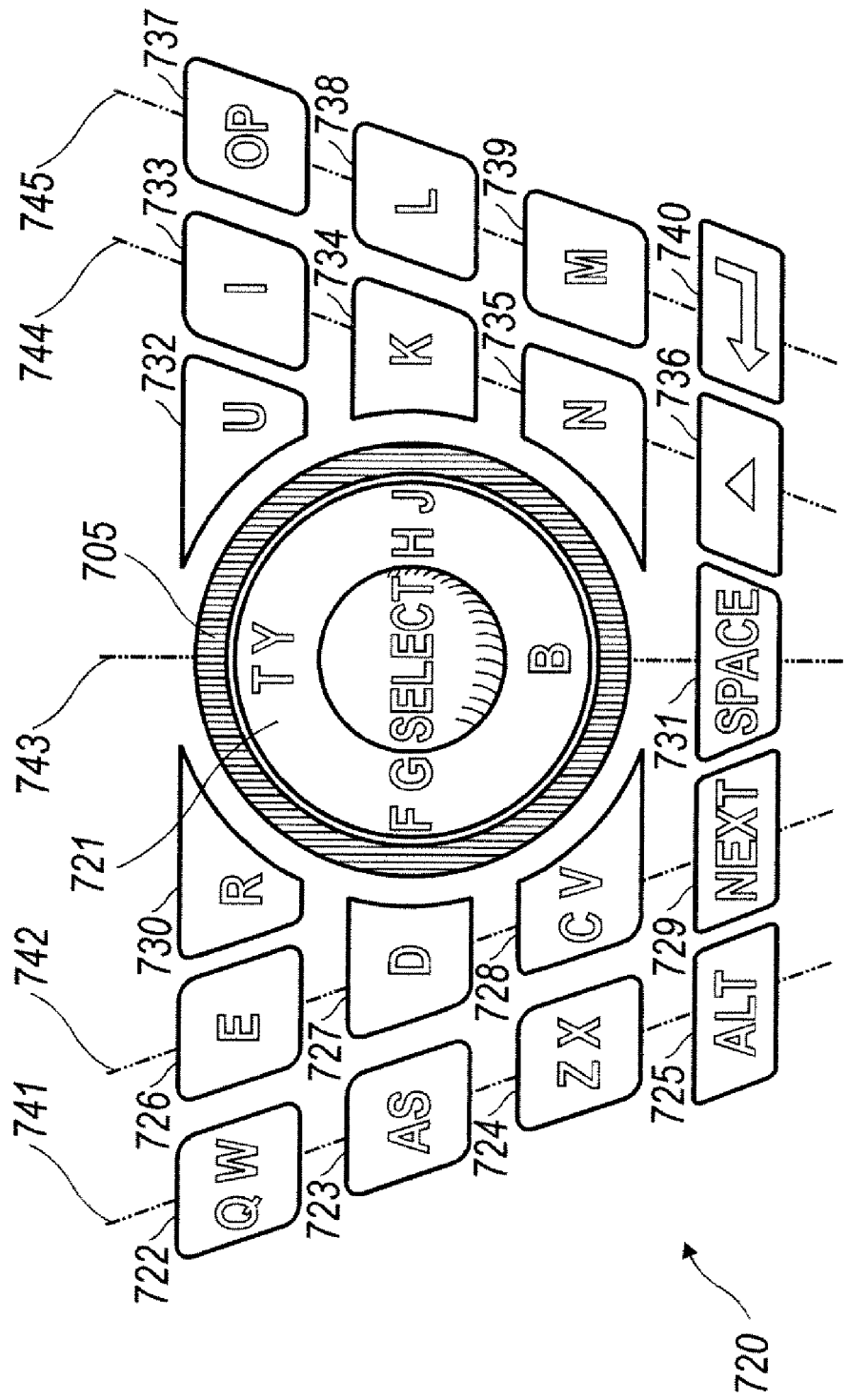
FIG. 22 is a front facing view of another example key arrangement.

As illustrated in at least FIG. 22, the trackball navigation tool (denoted by the designation "select") is at least partially surrounded by the key field. Moreover, as shown therein, a majority of the trackball navigation tool is surrounded by the key field.

Referring again to FIG. 1, the handheld wireless communication device 300 is also configured to send and receive voice communications such as mobile telephone calls. At least one key of the key field 650 is positioned adjacent to the trackball navigation tool and that key has a circular arc-shaped edge conformance fitting to a circular arc-shaped boundary about the trackball navigation tool 328. To facilitate telephone calls, two call keys 605, 609 oppositely and laterally flank the trackball navigation tool. One of the two call keys is a call initiation key 605 and the other is a call termination key 609.

The key 606 positioned adjacent to the trackball navigation tool 328 is a menu key that upon actuation displays an available action menu on the display in dependence of the currently running application on the device 300.

The trackball navigation tool 321 enables methods and arrangements for facilitating diagonal cursor movement in such environments as icon arrays 70 and spreadsheet grids on a display screen 322 of a relatively small, wireless handheld communication device 300, variously configured as described above, such as that depicted in FIG. 13. One exemplary embodiment takes the form of a method for affecting diagonal movement of a cursor 71 on the display screen 322 of a handheld communication device 300. The method includes sensing movement at an auxiliary user input 328 of the handheld communication device 300 indicative of the user's desire to affect diagonal movement of the cursor 71 on the display screen 322 of the handheld communication device 300. X-direction signals and Y-direction signals are produced based on the sensed movement at the auxiliary user input 328. During that time while the necessary signals are being collected and processed, the cursor 71 is held steady on the display screen 322 until a predetermined criterion is met for discriminating whether the user has indicated x-direction cursor movement, y-direction cursor movement or diagonal cursor movement. In that the processing is typically conducted by a processor 338 according to a resident computer program, the predetermined criterion is either a preset condition or a user definable condition, examples of which are discussed in greater detail hereinbelow. Finally, diagonal cursor movement is affected on the display screen 322 of the handheld communication device 300 when diagonal cursor movement is discriminated to have been user indicated.

Furthermore, the device is equipped with components to enable operation of various programs, as shown in FIG. 2. In an exemplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While the operating system 408 in a preferred embodiment is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Figure 13:
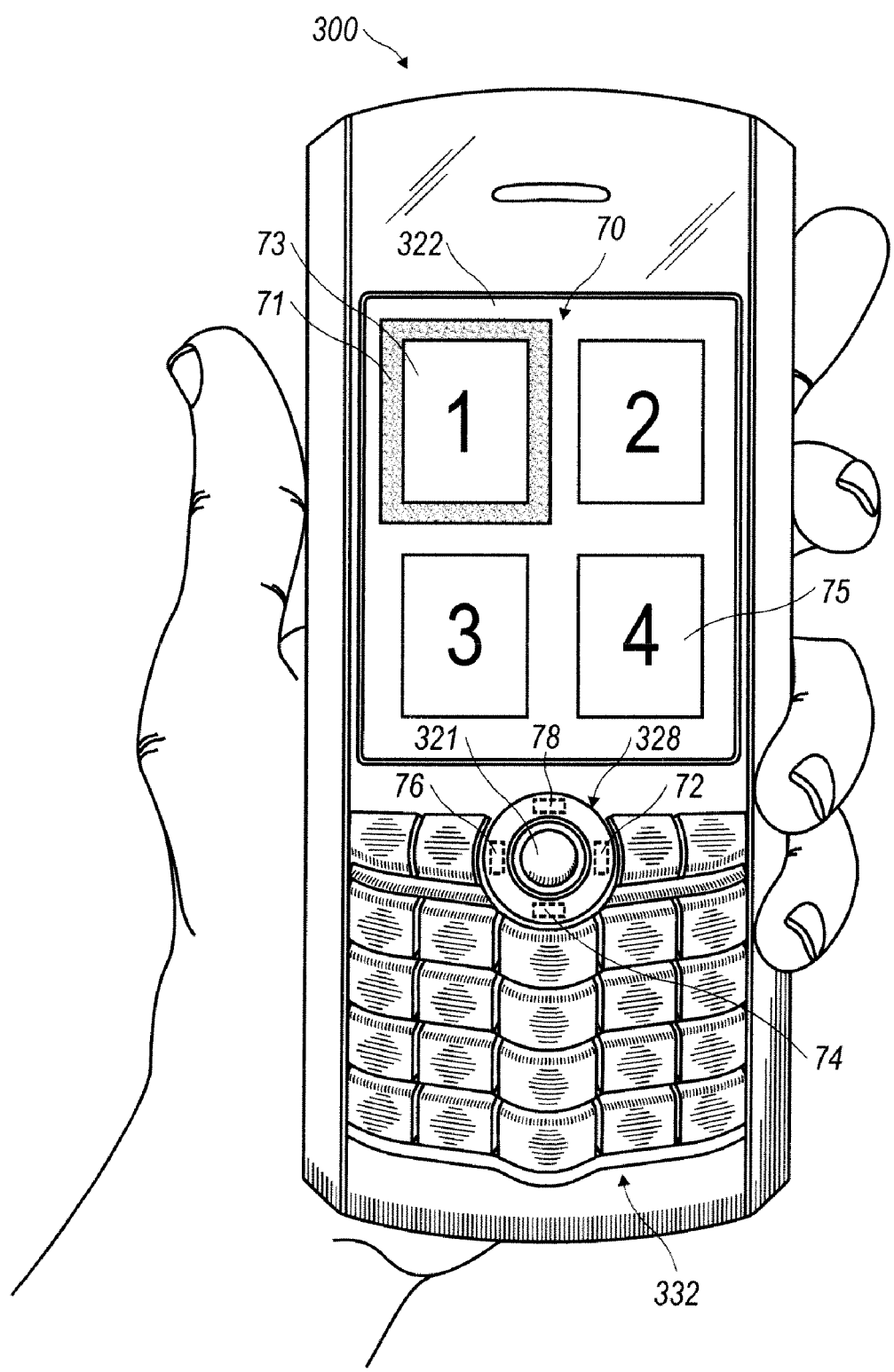
FIG. 13 is a perspective view of another exemplary handheld communication device cradled in a user's hand and displaying an array of four icons (1, 2, 3 and 4) on a display thereof.

The user is capable of interacting with the device 300 through reading information displayed on the display screen 322, entering text using the keyboard 332, and inputing cursor movement through the use of the auxiliary user input device 328, among other ways. The auxiliary user input device 328 as described above is preferably a trackball 321, as depicted in FIG. 13. Motion of the trackball 321 is assessed using a plurality of sensors 72, 74, 76, 78 that quantify rotational motion of the trackball 321 about an intersecting x-axis 82 and an intersecting y-axis 84 of the trackball (see FIG. 14).

In one embodiment, the plurality of sensors 72, 78 number two. One of the two sensors 72 outputs signals indicative of x-component rolling motion of the trackball 321 relative to the handheld communication device 300 and about the intersecting y-axis 84 of the trackball 321 (see the rotational arrows about the y-axis in FIG. 14). The other of the two sensors 78 outputs signals indicative of y-component rolling motion of the trackball 321 relative to the handheld communication device 300 and about the intersecting x-axis 82 of the trackball 321 (see the rotational arrows about the x-axis in FIG. 14). In this configuration, the two sensors 72, 78 are oriented radially about the trackball 321 with approximately ninety degree spacing therebetween. In one embodiment, each of the sensors is a hall effect sensor located proximate the trackball.

Figure 14:
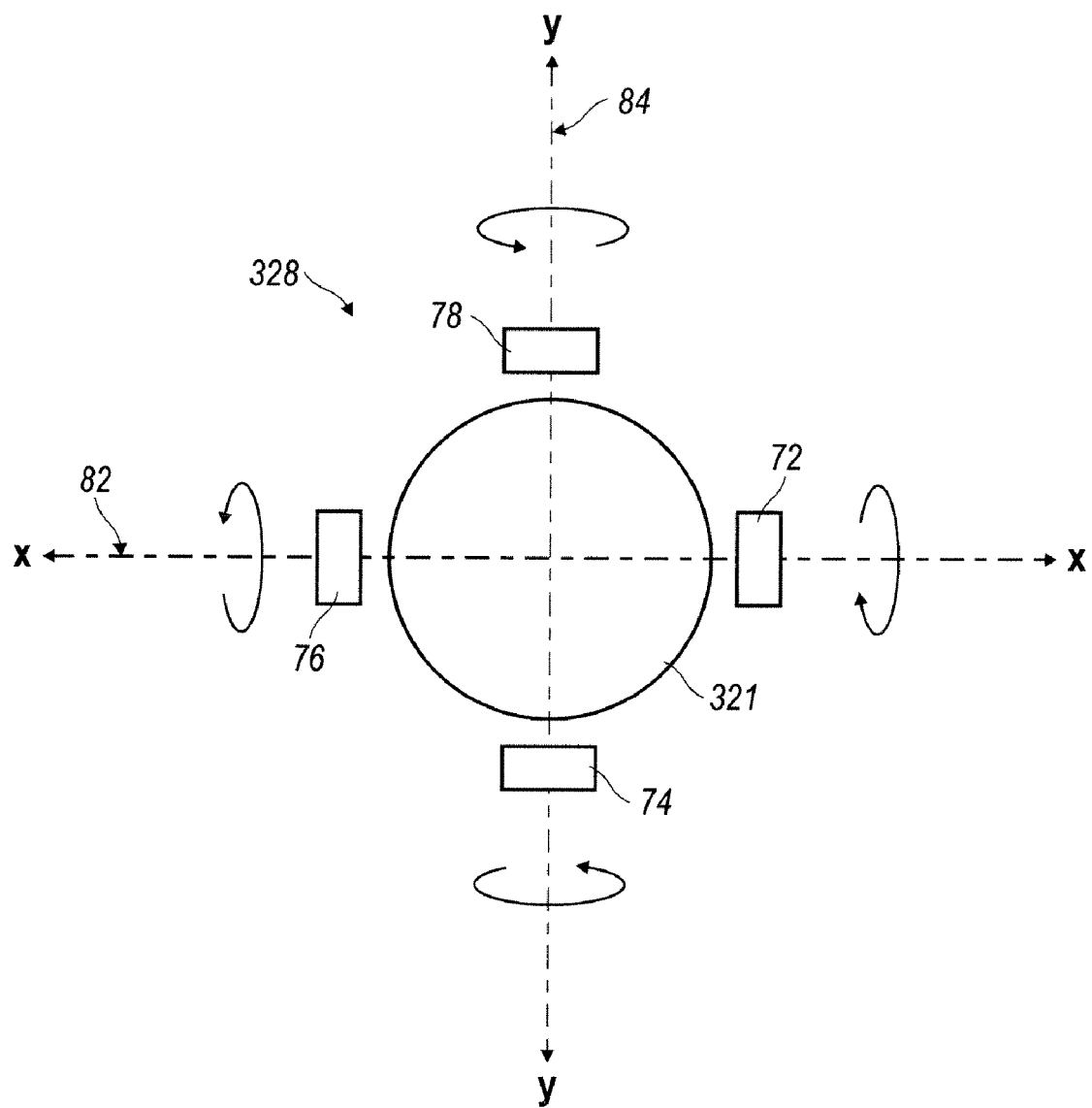
FIG. 14 is a schematic representation of an auxiliary user input in the form of a trackball.

In another embodiment, the plurality of sensors 72, 74, 76, 78 number four. A first pair of opposed sensors 72, 76 outputs signals indicative of x-component rolling motion of the trackball 321 relative to the handheld communication device 300 and about the intersecting y-axis 84. A second pair of opposed sensors 74, 78 outputs signals indicative of a y-component rolling motion of the trackball 321 relative to the handheld communication device 300 and about the intersecting x-axis 82. The four sensors 72, 74, 76, 78 are oriented radially about the trackball 321 with approximately ninety degree spacing between consecutive sensors as depicted in FIGS. 13 and 14.

Each produced x-direction signal represents a discrete amount of x-component (incremental x-direction) rolling motion of the trackball 321 relative to the handheld communication device 300 while each produced y-direction signal represents a discrete amount of y-component (incremental y-direction) rolling motion of the trackball 321 relative to the handheld communication device 300.

In a preferred embodiment, the predetermined criterion for discriminating user indicated x-direction cursor movement is identification of a threshold number of x-direction signals in a predetermined signal sample. For example, out of a moving-window sample of 10 consecutive signals, six or more must be x-signals in order to be indicative of desired x-direction cursor movement. Likewise, the predetermined criterion for discriminating user indicated y-direction cursor movement is identification of a threshold number of y-direction signals in a predetermined signal sample. The same sampling example holds, but applied to y-signals instead of x-signals. In a similar respect, the predetermined criterion for discriminating user indicated diagonal cursor movement is identification of a threshold number of x-direction signals and a threshold number of y-direction signals in a predetermined signal sample. For instance, out of a moving-window sample of 10 consecutive signals, four or more must be x-signals and four or more must be y-signals in order to be indicative of desired diagonal cursor movement.

In a more generic sense, it is pattern recognition software that is utilized to identify user indicated diagonal cursor movement based on analysis of a predetermined signal sample.

Alternatively, a method is disclosed for affecting diagonal movement of a highlighting cursor 71 amongst an array of icons 70 on a display screen 322 of a handheld communication device 300. Movement at an auxiliary user input 328 of the handheld communication device 300 is sensed and which is indicative of the user's desire to affect diagonal movement of the highlighting cursor 71 from a currently highlighted icon 73 on the display screen 322 to a diagonally located icon 75 on the display screen 322 of the handheld communication device 300. The movement is described as being "at" the auxiliary user input 328 to cover such situations as when the input is a touchpad or similar device since no portion of that type of input device actually moves, but the user's finger indicatively moves relative thereto (across the touchpad).

As in the previously described method, x-direction signals and y-direction signals are produced based on the sensed movement at the auxiliary user input 328. Again, the highlighting cursor 71 is held steady on a presently highlighted icon 73 on the display screen 322 while processing the x-direction signals and y-direction signals until a predetermined criterion is met for discriminating whether the user has indicated movement to an icon left or right of the presently highlighted icon 73, above or below the presently highlighted icon 73, or diagonally positioned relative to the presently highlighted icon 73. Diagonal movement of the highlighting cursor 73 is then affected between diagonally positioned icons on the display screen 322 of the handheld communication device 300 when diagonal cursor movement is discriminated to have been user indicated. In other respects, this embodiment is similar to that which has been earlier described.

In yet another embodiment, the apparatus of a handheld communication device 300 is disclosed that is capable of affecting diagonal movement of a highlighting cursor 71 amongst an array of icons 70 on a display screen 322 of the handheld communication device 300. The display screen 322 is located above a keyboard 332 suitable for accommodating textual input to the handheld communication device 300 and an auxiliary user input 328 is located essentially between the display 322 and keyboard 332. Sensors 72, 78 (74, 76) are provided that are capable of sensing movement at the auxiliary user input 328 indicative of the user's desire to affect diagonal movement of the highlighting cursor 71 from a currently highlighted icon number 73 on the display screen 322 to a diagonally located icon 75 on the display screen 322 of the handheld communication device 300. The sensors produce x-direction signals and y-direction signals based on the sensed movement at the auxiliary user input 328. A processor 338 is included that is capable of analyzing the produced x-direction signals and y-direction signals and outputting a cursor control signal that holds the highlighting cursor 71 steady on a presently highlighted icon 73 on the display screen 322 during the processing and until a predetermined criterion is met for discriminating whether the user has indicated movement to an icon left or right of the presently highlighted icon, above or below the presently highlighted icon 73, or diagonally positioned relative to the presently highlighted icon numeral 73 and then affecting diagonal movement of the highlighting cursor number 71 between diagonally positioned icons on the display screen of the handheld communication device 300 when diagonal cursor movement is discriminated to have been user indicated.

As mentioned hereinabove, there are situations in which the user will not want the X and Y signals to be converted into diagonal movement generating signals. For example, when navigating a map scene or other type of image, fine directional movement from the navigation tool will be most desired; otherwise the "collection" of X and Y signals produces undesirable "jerky" cursor movement. Therefore, in at least one embodiment, the diagonal movement feature can be turned on and off by the user, or be automatically set in dependence upon the application that is being cursor-traversed.

Figure 15:
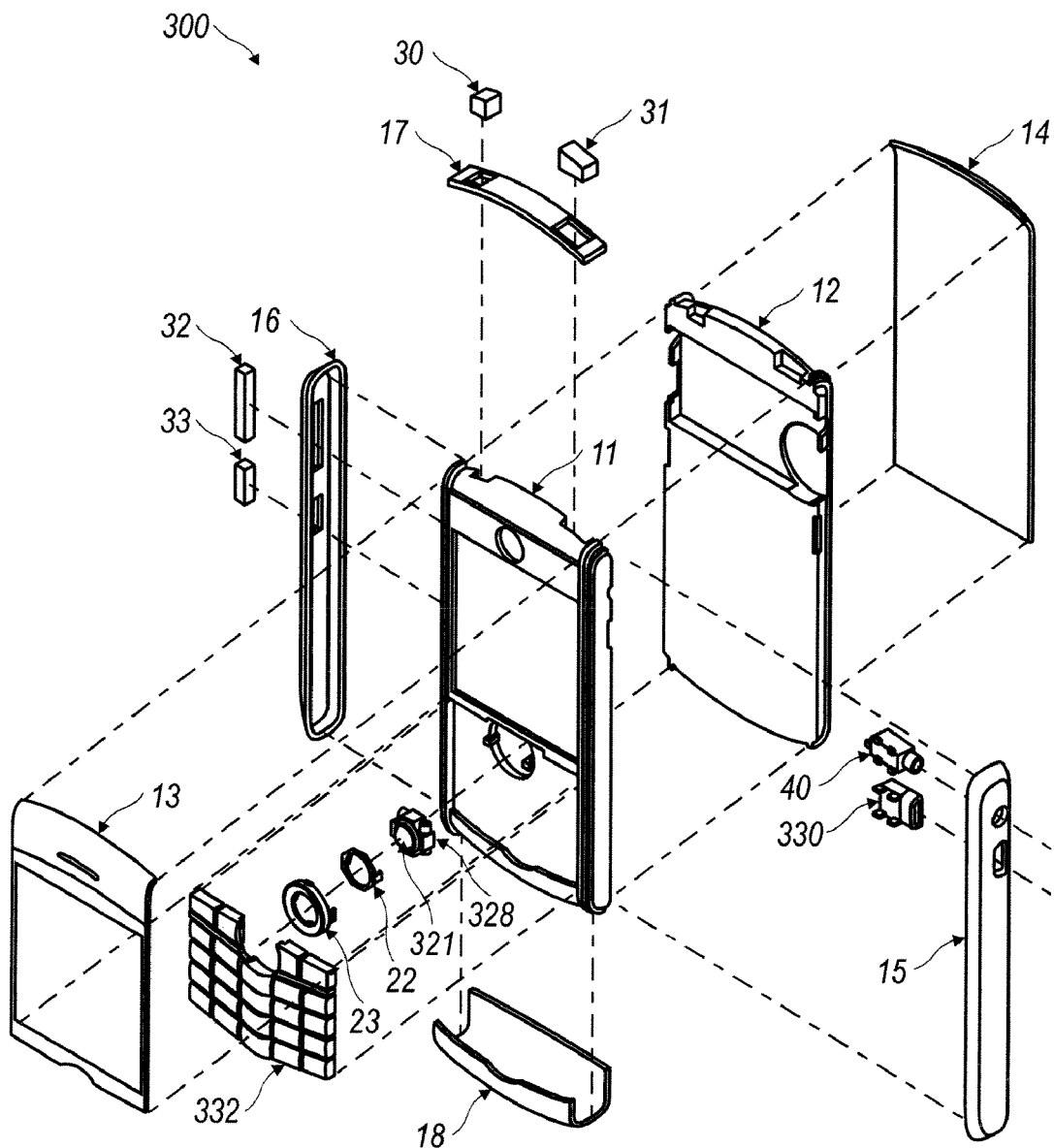
FIG. 15 is an exploded perspective view of an exemplary wireless handheld electronic device incorporating a trackball assembly as the auxiliary user input.

The integration of the trackball assembly into handheld device 300 can be seen in the exploded view of FIG. 15 showing some of the typical components found in the assembly of the handheld electronic device 300. The construction of the device benefits from various manufacturing simplifications. The internal components are constructed on a single PCB (printed circuit board) 12. The keyboard 332 is constructed from a single piece of material, and in a preferred embodiment is made from plastic. The keyboard 332 sits over dome switches (not shown) located on the PCB 12 in a preferred embodiment. One switch is provided for every key on the keyboard in the preferred embodiment, but in other embodiments more than one switch or less than one switch per key are possible configurations. The support frame 11 holds the keyboard 332 and navigation tool 328 in place above the PCB 12. The support frame 11 also provides an attachment point for the display (not shown). A lens 13 covers the display to prevent damage. When assembled, the support frame 11 and the PCB 12 are fixably attached to each other and the display is positioned between the PCB 12 and support frame 11.

The navigation tool 328 is frictionally engaged with the support frame 11, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 15, the navigation tool 328 is a ball 321 based device. Other navigation tools 328 such as joysticks, four-way cursors, or touch pads are also considered to be within the scope of this disclosure. When the navigation tool 328 has a ball 321, the ball 321 itself can be removed without removal of the navigation tool 328. The removal of the ball 321 is enabled through the use of an outer removable ring 23 and an inner removable ring 22. These rings 22, 23 ensure that the navigation tool 328 and the ball 321 are properly held in place against the support frame 11.

A serial port (preferably a Universal Serial Bus port) 330 and an earphone jack 40 are fixably attached to the PCB 12 and further held in place by right side element 15. Buttons 30-33 are attached to switches (not shown), which are connected to the PCB 12.

Final assembly involves placing the top piece 17 and bottom piece 18 in contact with support frame 11. Furthermore, the assembly interconnects right side element 15 and left side element 16 with the support frame 11, PCB 12, and lens 13. These side elements 16, 15 provide additional protection and strength to the support structure of the device 300. In a preferred embodiment, backplate 14 is removably attached to the other elements of the device.

In one respect, the present disclosure is directed toward a method for displaying an abbreviated menu on the screen of a handheld electronic device 300 at the request of the user. Typical examples of such devices include PDAs, mobile telephones and multi-mode communicator devices such as those capable of transmitting both voice and text messages such as email. The method includes displaying a cursor-navigable page on a screen 322 of a handheld electronic device 300. One example would be the text of an open email message 620, see FIG. 5C. Next, the user initiates an ambiguous request for the display of menu options corresponding to the displayed page while a cursor is positioned at a location on the page that is not visually signified for menu display actuation. For instance, with the screen cursor positioned upon the body of the open email message 620, but where there is no visual indicator that the location is one which will cause a menu to be displayed if actuated, an action is taken such as pressing a button on the device 300 that indicates the user's desire to take action with respect to the displayed page (open email message 620). There are several actions which might be taken with respect to the open email message 620, but none has been specified; therefore, the request is termed ambiguous. Responsively, the device 300, under the control of an included microprocessor 338, displays a short menu 624 having a first list of menu items which is a subset of a second list of menu items that make up an extended menu 618 associated with the displayed page, see FIGS. 5d, 5e. This first list of menu items has been assessed a higher probability for being user-selected or desired than at least some of the remaining items of the second list. This means that there is a long list (the second list) of actions that might be taken when the email message is displayed, but there is also a predefined short subset (the first list) of actions of this long list which have been assessed to be more frequently selected/desired, so it is this short listing of selectable actions that is displayed in response to the user's ambiguous request since one of the available actions on the short list is likely to satisfy the user's need.

In at least one version of the device 300, the user's ambiguous request is made through an auxiliary user input device 328 on the handheld electronic device 300. One example of the auxiliary user input device 328 is a navigation tool, such as a trackball 321, that controls movement of the cursor on the screen 322 of the handheld electronic device 300.

The device 300 may also include an input that issues a non-ambiguous request to display the extended menu 618 associated with the displayed page, and which may be simply constituted by an actuable button or the like.

In order to facilitate usability, it is also contemplated that selectable items on the short listing can include choices to expand the short menu 624 to the extended menu 618, or to close the short menu 624. In order to reinforce the commonality between the extended menu 618 choice on the short list and the dedicated push-button for the long list, each is marked with a similar insignia.

In order to take full advantage of the small screen 322 of the handheld device 300, the short menu 624 is displayed on the screen 322 in place of the displayed page, and preferably fills a substantial entirety of the screen 322.

Benefits of the disclosed hierarchical menu system include the ability to implement a hierarchical menu on devices having varying screen sizes, including small-screen devices. The disclosed hierarchical menu permits the display of one menu at a time. In an almost intuitive manner, the methods disclosed allow the user to make an ambiguous selection to directly open a particular item on a displayed page or to display a short menu 624 of items typically used with a displayed page. This reduces user confusion and enhances usability of the system. By using a "menu" item on the short menu 624 or a menu key 606, the user always has the option to view the extended menu 618 associated with the displayed page. By using a "back" menu item or key 608, the user can navigate to previously displayed menus within the string of historically selected menus without cluttering the displayed menus with such historical items.

The menuing task is generally performed by a menuing subsystem or hierarchical menu module 412 of an operating system 408 executing on a handheld electronic device 300. Accordingly, as illustrated relative to the handheld electronic device 300 of FIG. 2, a hierarchical menu module 412 is implemented as part of the operating system 408. In general, the module 412 is configured to receive menu calls from various applications 358 and to service those calls by displaying a menu on a display screen 322 according to the parameters provided by the application 358 making the menu call. Although module 412 is illustrated as being part of operating system 408, it is noted that the module 412 might also function as a stand-alone module 412 stored in memory 324 and executable on a processor 338. In general, although the functioning of module 412 as part of operating system 408 is preferred, it is not intended as a limitation regarding its implementation by a handheld electronic device 300.

In addition to managing typical menuing functions, the hierarchical menu module 412 implements a hierarchical menu in accordance with application programs 358 that support hierarchical menus. Thus, for applications 358 designed to provide hierarchical menus, hierarchal menu module 412 is configured to implement those hierarchical menus as hierarchical menus with ambiguous selection. The implementation of a hierarchical menu as a hierarchical menu with ambiguous selection can occur automatically for any application 358 making a hierarchical menu call to operating system 408. Alternatively, it can occur based on a specific request from an application 358 to implement the hierarchical menu as a hierarchical menu with ambiguous selection. Thus, handheld electronic device 300 manufacturers can configure the devices to automatically provide hierarchical menus which facilitate application developers. This enables application developers to design hierarchical menus, both extended 618 and short 624, in a typical manner without making any changes to their application 358 source code. Alternatively, handheld electronic device 300 manufacturers can configure devices 300 to provide hierarchical menus with ambiguous selection by default, or upon request for application 358 developers. This enables application 358 developers to design hierarchical menus in a typical manner and further allows them to determine if application 358 menus will be implemented as hierarchical menus with ambiguous selection by making a simple selection through their application source code to identify what action should occur in response to an ambiguous selection and populate short menus 624 with preferably those actions, tasks or other commands most commonly used with respect to the displayed page on the screen 322.

Referring to FIGS. 1, 3a, 3b, 4, and 5a-5e, the following is a discussion and comparison of the use of the extended 618 and short 624 menus on the handheld electronic device 300.

In the embodiment depicted in FIG. 1, the device 300 has a first input controller, which is preferably an auxiliary I/O subsystem 328 having a depressible rolling member or trackball 321, which is used to access the short menu 624. The handheld device 300 also has a second input controller, in this case menu key 606, which is used to access the applicable extended menu 618. These menus 618, 624 are based on the interface principle of see and click. In this manner, users do not have to remember commands or options because they can view these options at any time.

FIG. 1 also depicts a display screen 322 and keyboard 332. The display screen 322 serves as a user interface (UI) visually presenting information to the user. The trackball 321 and the menu key 606 are part of the input portion. To the right of the trackball 321 is a back key 608, which is used to back-up through previous screens or menus displayed on the display screen 322.

Figure 3A:
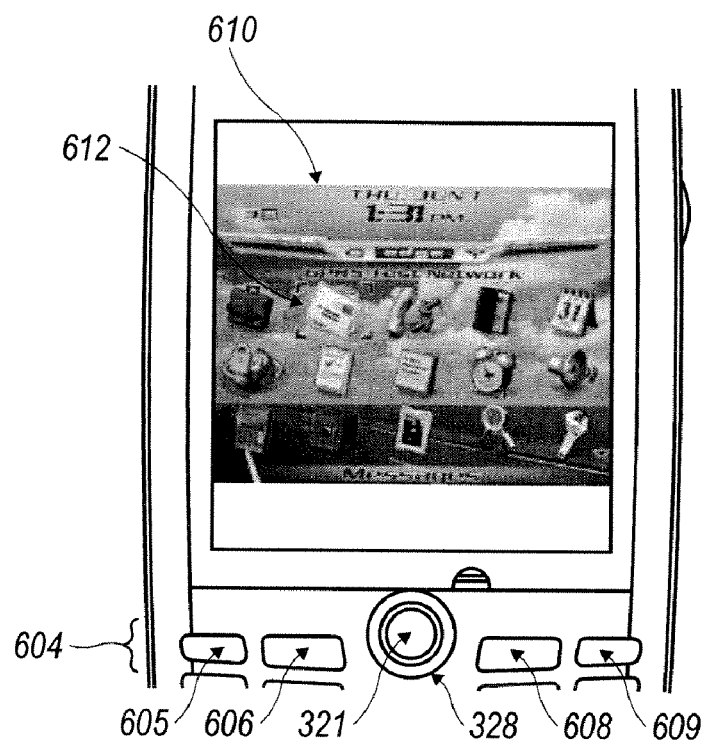
FIG. 3a is a device-displayed home screen which shows a set of icons representing various applications available on the device and the email icon is selected.
Figure 3B:
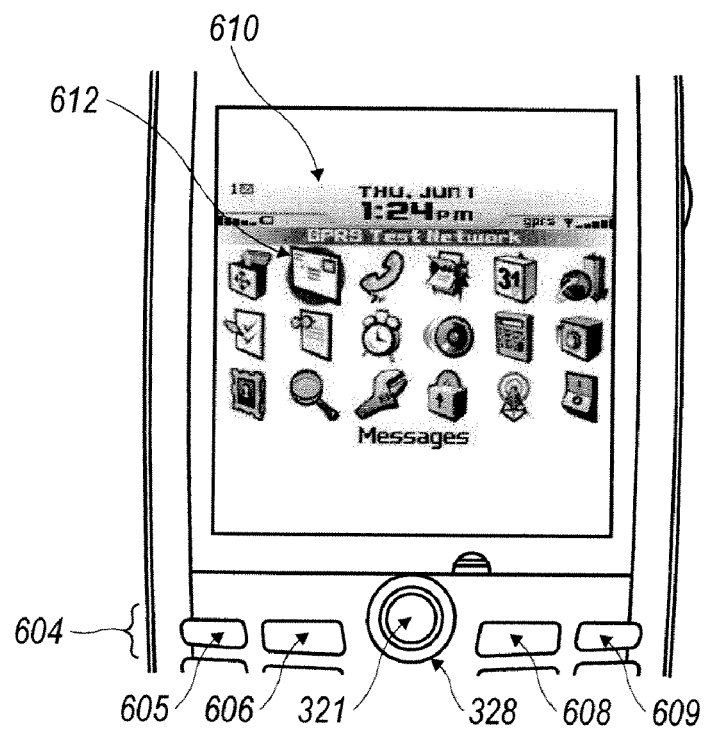
FIG. 3b is a device-displayed home screen which shows another set of icons representing various applications available on the device and the email icon is selected.

The initial screen for the device 300 is a home screen 610. Two examples of a home screen 610 are shown in FIGS. 3a and 3b, which show different sets of icons representing various applications 358 that are available on the device 300. The user can perform desired high-level activities from the home screen 610, and within an application 358 explore and access functionality of the selected application 358.

The menu key or button 606 is to the left of the trackball 321 and activates an extended menu 618 that lists actions likely desirable relative to the presently displayed screen 610. The menu key or button 606 provides a consistent location where the user can look for commands. Each application 358 has its own extended menu 618 consisting of application-specific menus.

Clicking (depressing) the trackball 321 when an icon on the home screen 610 is highlighted opens the application 358, preferably to a common page used by users. For example, if the email message's icon 612 is highlighted, then a page listing the messages 616 will open (See FIG. 5a). When not on the home screen 610, but while a page of an application 358 is displayed without a menu showing, clicking the trackball 321 is referred to as an ambiguous selection since several commands may apply in that circumstance. This ambiguous selection will cause a short menu 624 to appear on the display screen 322. The short menu 624 contains a list of menu items that are preferably the most commonly used commands in the present screen context. These short menus 624 again are based on the interface principle of see and click. The options or menus change according to the task at hand.

The items shown in these short menus 624 preferably are those that a user performs frequently. In other embodiments, the short menu 624 is selected based on either predefined user or programmer preference. These short menus 624 are preferably correctly organized, worded clearly, and behave correctly in order for the user to understand what options they should expect to see, and how to access the additional functionality specific to the selected application 358.

Figure 5A:
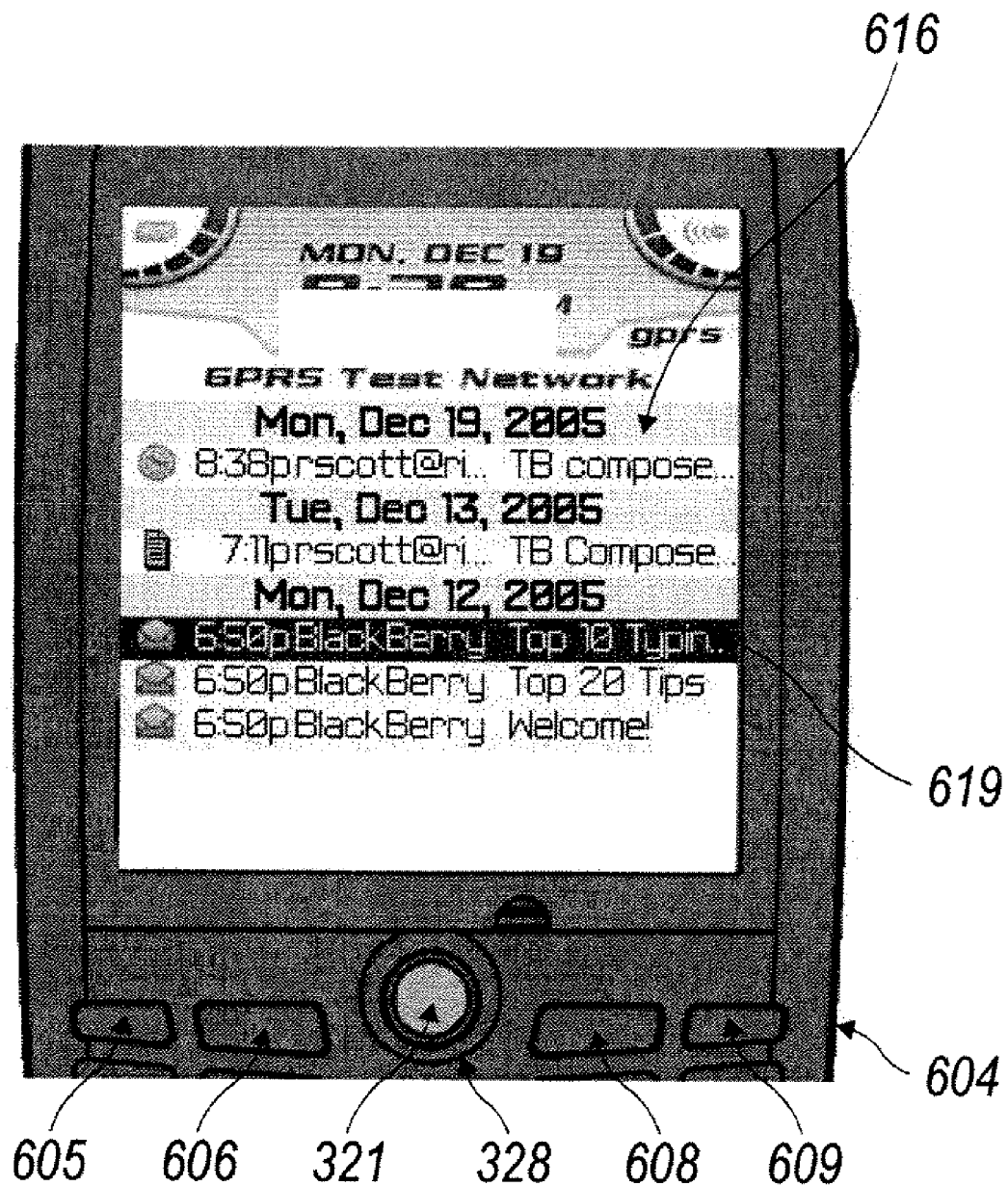
FIG. 5a is a device-displayed email listing.
Figure 5B:
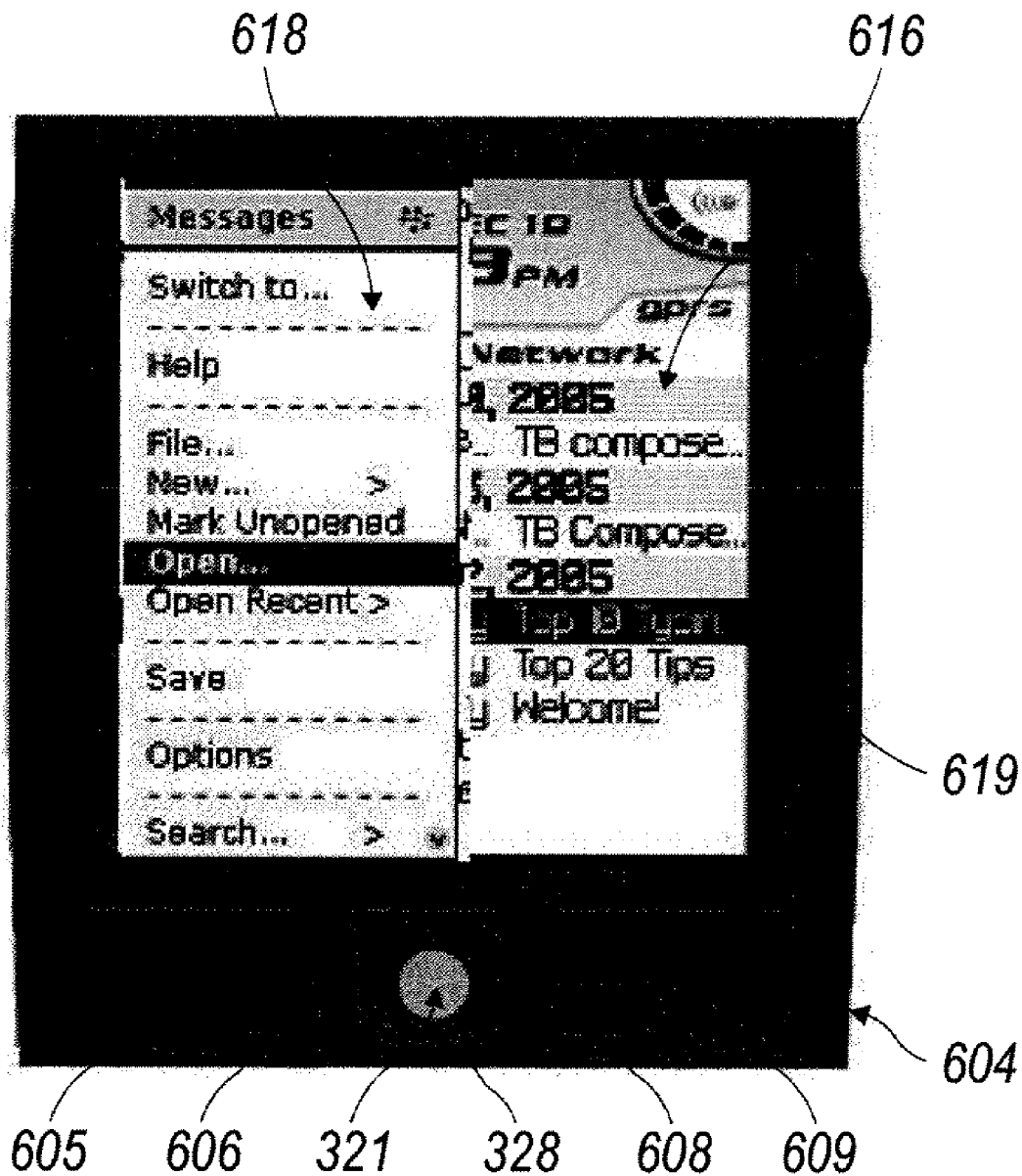
FIG. 5b is a device-displayed extended menu relevant to the email listing.
Figure 5C:
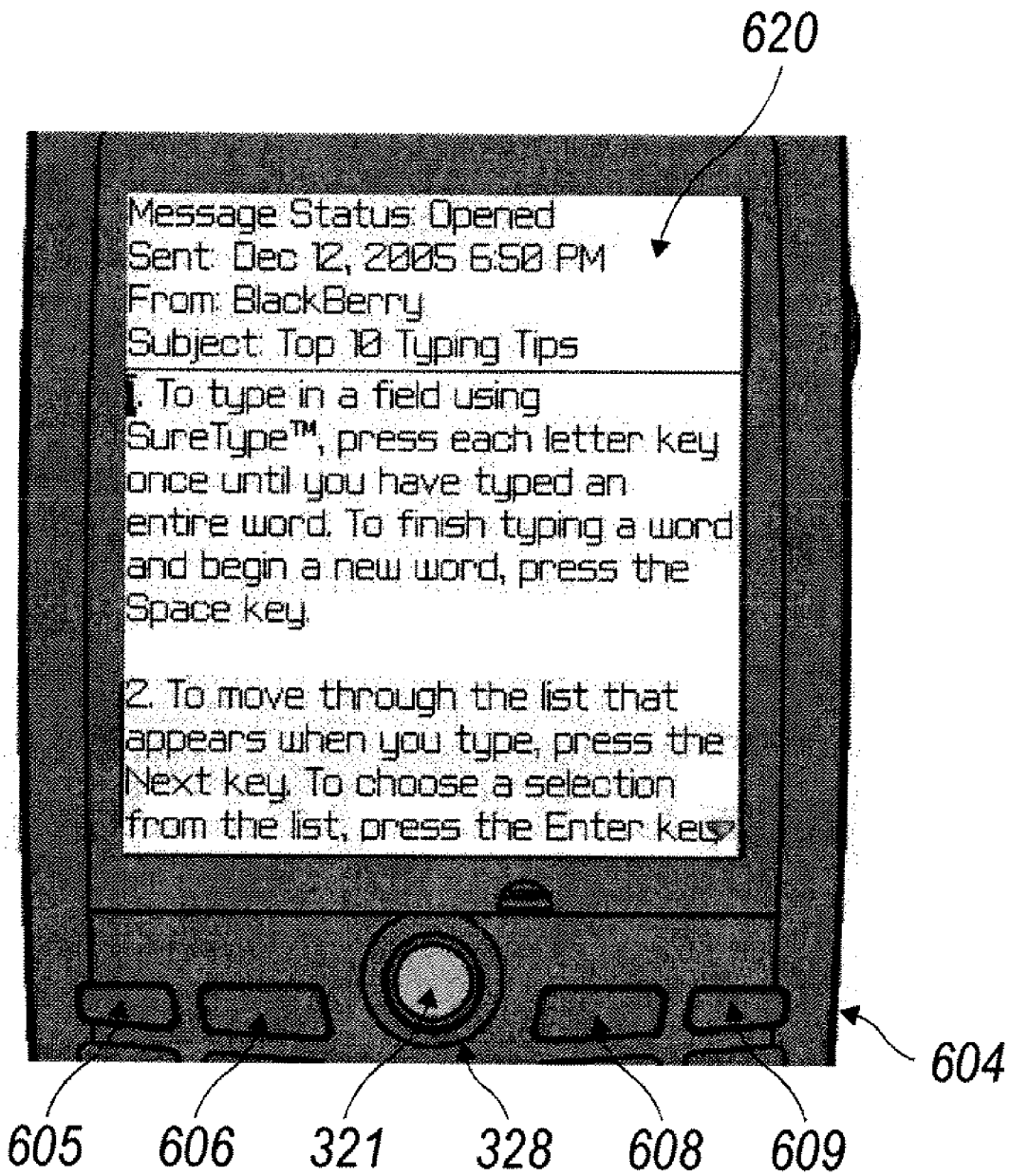
FIG. 5c is a device-displayed open message chosen from the email listing.
Figure 5D:
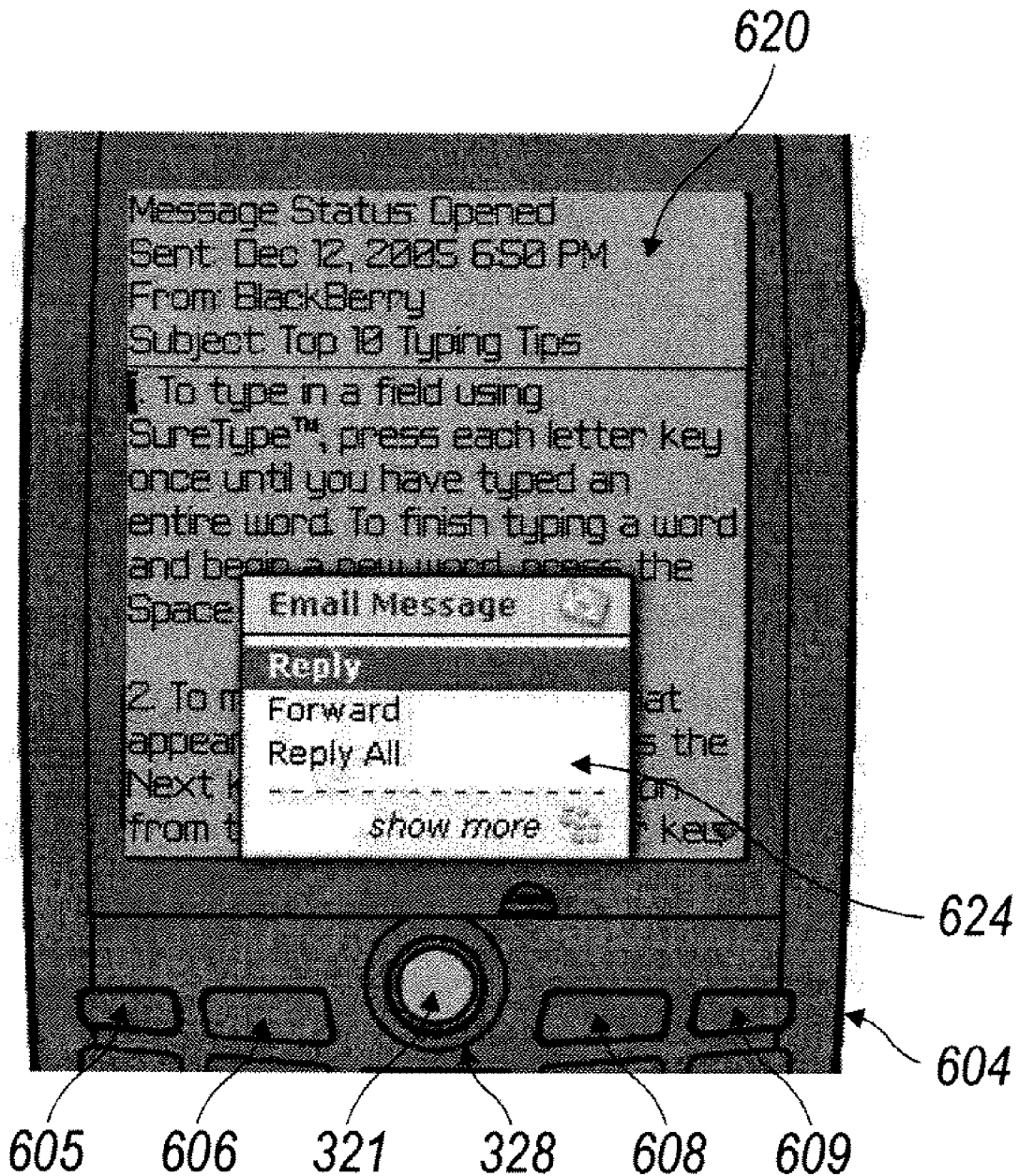
FIG. 5d is a user requested short menu that presents frequently desired actions relative to an open email message.
Figure 5E:
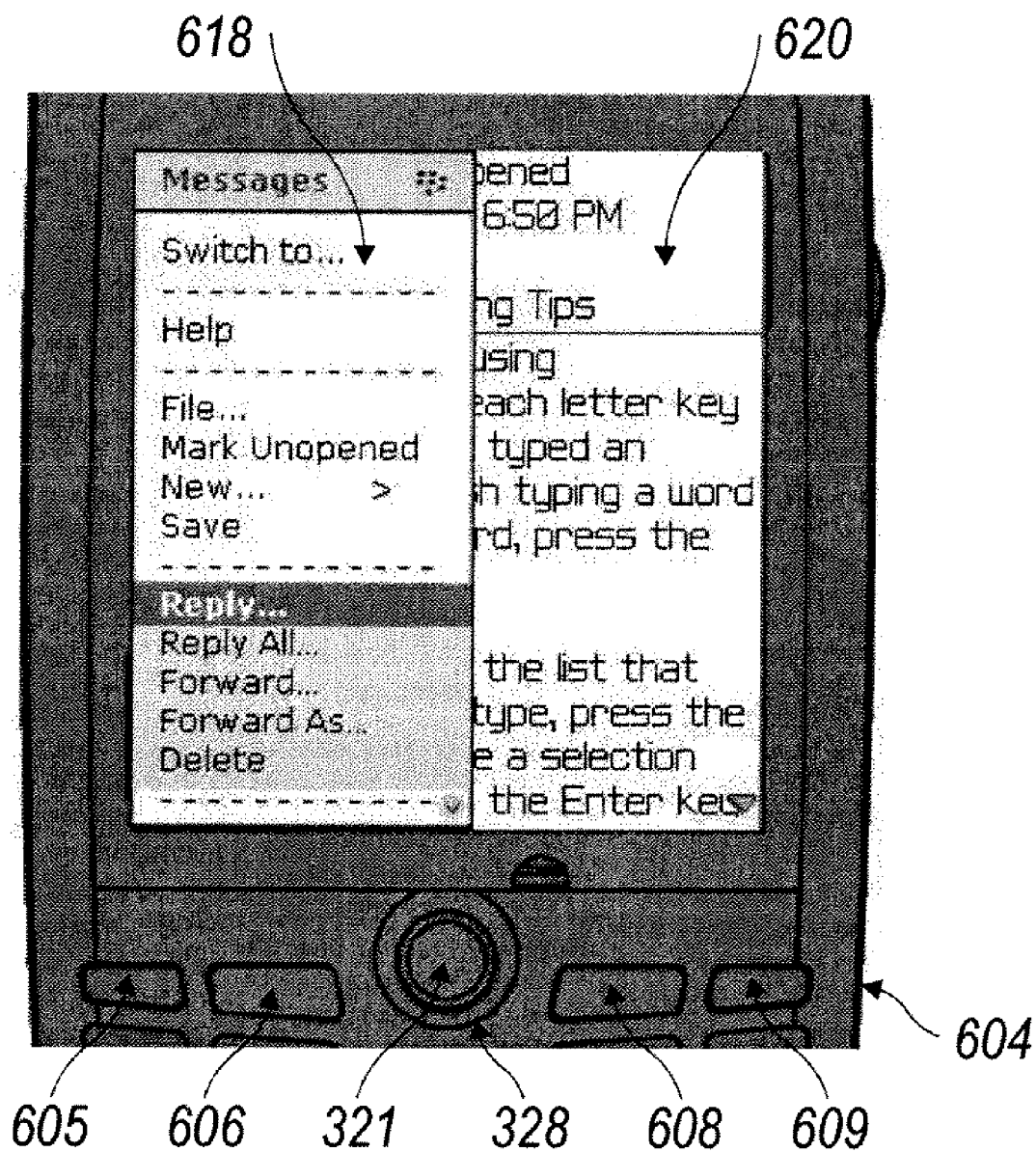
FIG. 5e is an extended menu that presents further options relevant to an open email message which was displayed based on a user selection of the "show more" option of FIG. 5d.

In at least one embodiment, the items displayed in the short menu 624 are dynamically updated depending upon the user's selection of items from the extended menu 618 (See FIGS. 5d and 5e). As items are repeatedly selected from the extended menu 618, the menu items are ranked and depending upon their frequency of selection will relatively appear in the short menu 624. The number of items in the short menu 624 is preferably between two and ten items. The items displayed in the short menu 624 can also be user selected in one embodiment.

In another embodiment, the information for the short menu 624 is stored locally as well as at a central location. The transmission of the short menus 624 that are applicable for the particular user is via a communication system as described below. The information stored at the central location allows the user to access that information on multiple devices. This will allow the user to experience identical menus on different devices. This is helpful when a user would like to encounter the same interface, but uses the devices in different ways. The information alternatively may be stored on a memory card and transferred between devices via the memory card.

For purposes of example, in the following disclosure, the use of the menus 618, 624, trackball 321 and keys are discussed relative to the use of an email message application 358.

Figure 4:
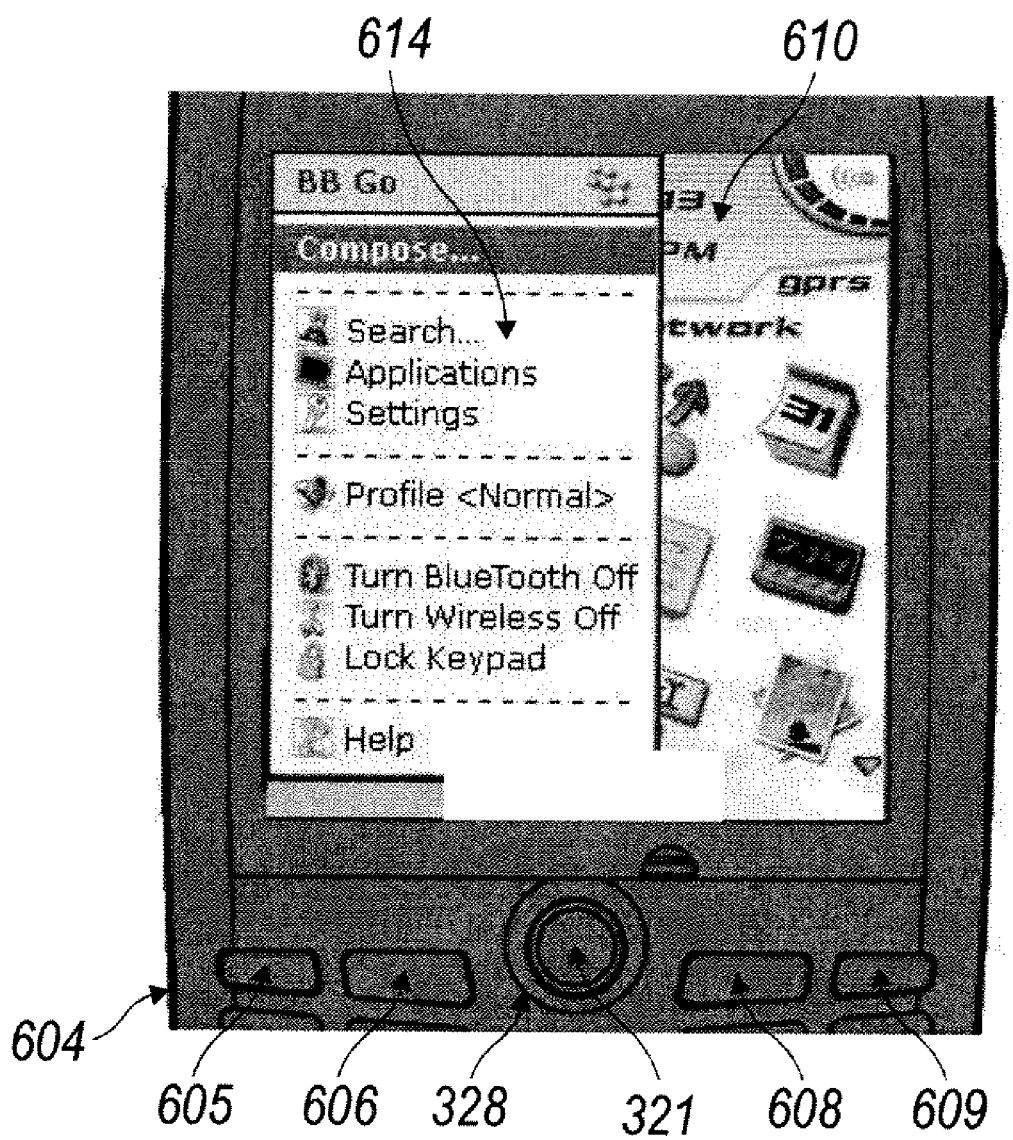
FIG. 4 is a device-displayed high level extended menu associated with the email icon on the home screen.

Initially, the user uses the trackball 321 to scroll to the desired application 358. In this case, it is the email messaging application 358. In FIGS. 3a and 3b, the email icon 612 (a letter envelope) is highlighted in a conventional manner, for example, with a frame as shown in FIG. 3a or with a highlighted background as depicted in FIG. 3b. Then, the menu key 606 is activated by depressing or "clicking" it, which brings up a high level extended menu 614 as shown in FIG. 4. This menu 614 can include the following menu items:

Compose...
---------------
Search...
Applications
Settings
---------------
Profile < Normal >
---------------
BlueTooth On/Off
Wireless On/Off
Key Lock On/Off
---------------
Help For example, clicking on "Compose" would initiate the address book function 352 and allow the user to select an addressee, select the type of message (email, SMS, IM, etc.) and proceed with the composition of a message. However, for the present example, the user desires to open their email message mailbox and view a list of email messages 616. In another embodiment, the menu includes the option "close," which will close the menu. Preferably, the option to close the menu is listed near the bottom. This enables closing of the menu without requiring the use of an additional key to close the menu.

To do this, the menu key 606 is clicked again and the high level extended menu 614 for the email messaging application 358 is displayed, as shown in FIG. 4. If the menu item "Open" is not already highlighted, then the trackball 321 is used to scroll to this item such that it is highlighted. Once the menu item "Open" is highlighted, the trackball 321 is clicked. A list of email messages 616 is displayed on the screen 322 as shown in FIG. 5a.

In order to open and read a particular email message, the trackball 321 is then used to scroll to the desired email message 619 in the displayed list causing it to be highlighted. The menu key 606 is clicked and the extended menu 618 is displayed, for example as shown in FIG. 5b. If the menu item "Open" is not already highlighted, then the trackball 321 is used to scroll to this item such that it is highlighted. Once the menu item "Open" is highlighted, the trackball 321 is clicked. The desired message 620 is displayed on the display screen 322 as shown in FIG. 5c.

The user then decides what to do as a result of reading the message. To perform the next action, the user clicks the menu key 606 and another extended menu 618 appears as shown in FIG. 5e. If not already highlighted, the user then scrolls to the desired menu item using the trackball 321 until the desired menu item (action or task) is highlighted. Then, the user clicks the trackball 321 to activate the desired action or task.

The use of the short menu 624 usually requires fewer clicks to perform the same action as compared to the use of solely the extended menus 618. For example, the following is an embodiment using the ambiguous selections and/or short menus 624 to open the email messaging application 358 and to open a particular email message.

Starting from the home screen or menu 610, the trackball 321 is used to scroll to and highlight the email message icon 612 as shown in FIGS. 3a and 3b. Clicking the trackball 321 directly opens the list of messages 616 as shown in FIG. 5a. The trackball 321 is clicked while no menu is present and this action is an ambiguous selection since more than one action or task is possible. This ambiguous selection while on the home screen 610 and with the email icon 612 highlighted is treated by the hierarchal menu module 412 as a direction or command to open the highlighted application 358. In this embodiment, it is believed that the user is attempting to perform the task of opening the email application program 358 and the hierarchal menu module 412 is programmed accordingly. Displaying the list of emails 616, as shown in FIG. 5a, is the action or task believed to be the most common desired, and thus to the user, the procedure appears intuitive. Such ambiguous selection for other application 358 is preferably programmed with the most common desired task or action for the selected application 358.

In this regard, it is appreciated that opening the email message list 616 took two clicks and one scrolling using the extended menus 618, whereas with the ambiguous selection routine of the hierarchal menu module 412 this was reduced to just a single click.

Now, with the email message list 616 on the display 322, the user scrolls to the desired email message, clicks with the trackball 321, and the desired open email message 620 is displayed on the screen 322, as shown in FIG. 5c. Again, there is no menu on the display 322 and the action is an ambiguous selection since more than one action or task is possible.

In this regard, it is also appreciated that opening a desired email message took two clicks and possibly a scroll, whereas with the ambiguous selection routine of the hierarchal menu module 412, this was reduced to just a single click.

While the user is viewing the open email message 620 on the display screen 322 after having read its contents, the user clicks the trackball 321 making another ambiguous selection, again since no menu is on the display screen 322 and more than one action or task is possible. This ambiguous selection causes the menu program to display a short menu 624, preferably of menu items corresponding to actions or tasks commonly performed by users at that point. In this embodiment, a short menu 624 is shown in FIG. 5*d*, and contains the actions or tasks—"Reply", "Forward" and "Reply All." The user then decides which action or task to perform and scrolls to it and clicks the trackball 321. Novice and experienced users alike benefit from the reduction in information displayed on the short menu 624 through the removal of less commonly used tasks. The short menu 624, as shown in FIG. 5*d*, contains a title "Email Message," thus providing information about the application 358 that is associated with the menu. Likewise, other titles for other menus would be appropriate at times when menus are displayed in connection with other applications 358. In other embodiments, the short menu 624 features the menu item "close" in addition to those items described above.

Thus, the short menu 624 provides convenient access to the high level, most often-used commands associated with an application 358. The short menu 624 that is displayed can also depend on the position of the cursor within the displayed page. The short menu 624 can be considered as a shortcut to commands that make sense to the task at hand. In some cases, when on the home screen 610, rather than opening the indicated application 358, a short menu 624 can be displayed with the more common subset of actions, tasks or other commands by affecting an ambiguous request by clicking on a highlighted application 358 icon on the home screen 610.

If the desired action or task is not listed on the short menu 624, the user can click the menu key 606 to view the extended menu 618, such as shown in FIG. 5*e* using the exemplary email messaging scenario. Alternatively, the short menu 624 can have a menu item that allows the user to scroll to and select the item as shown in FIG. 5*d*. Once that menu item has been selected, then the extended menu 618 replaces the short menu 624. For example, the short menu 624 in FIG. 5*d* has a menu item "show more" for this purpose. The name of this menu item can be any other that conveys a similar meaning, such as "Full" or "Extended" or an icon that is used by the device 300 provider and identified in its literature to have that meaning. Likewise, the menu key 606 in a preferred embodiment features an icon or the like that is shown next to the "show more" menu item.

Other applications of short menus 624 are possible as well. Another example of the use of a short menu 624 is when the device 300 features soft keys that can be user customized. Since these soft keys are user customizable, a short menu 624 can be activated when the soft key is activated two times without any additional user input and/or within a predefined time period. The short menu 624 would present options to change the soft key to bring up different program options. The short menu 624 likewise could feature the extended menu 618 features and close options mentioned above.

Example methods for implementing an embodiment of a hierarchical menu and ambiguous selection will now be described with primary reference to the flow diagram of FIG. 6. The methods apply generally to the exemplary embodiments discussed above with respect to FIGS. 3*a*, 3*b*, 4, 5*a*-5*e*. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor 338. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), a portable compact disc read-only memory (CDROM) (optical), and a solid state storage device (magnetic; e.g., flash memory).

Figure 6:
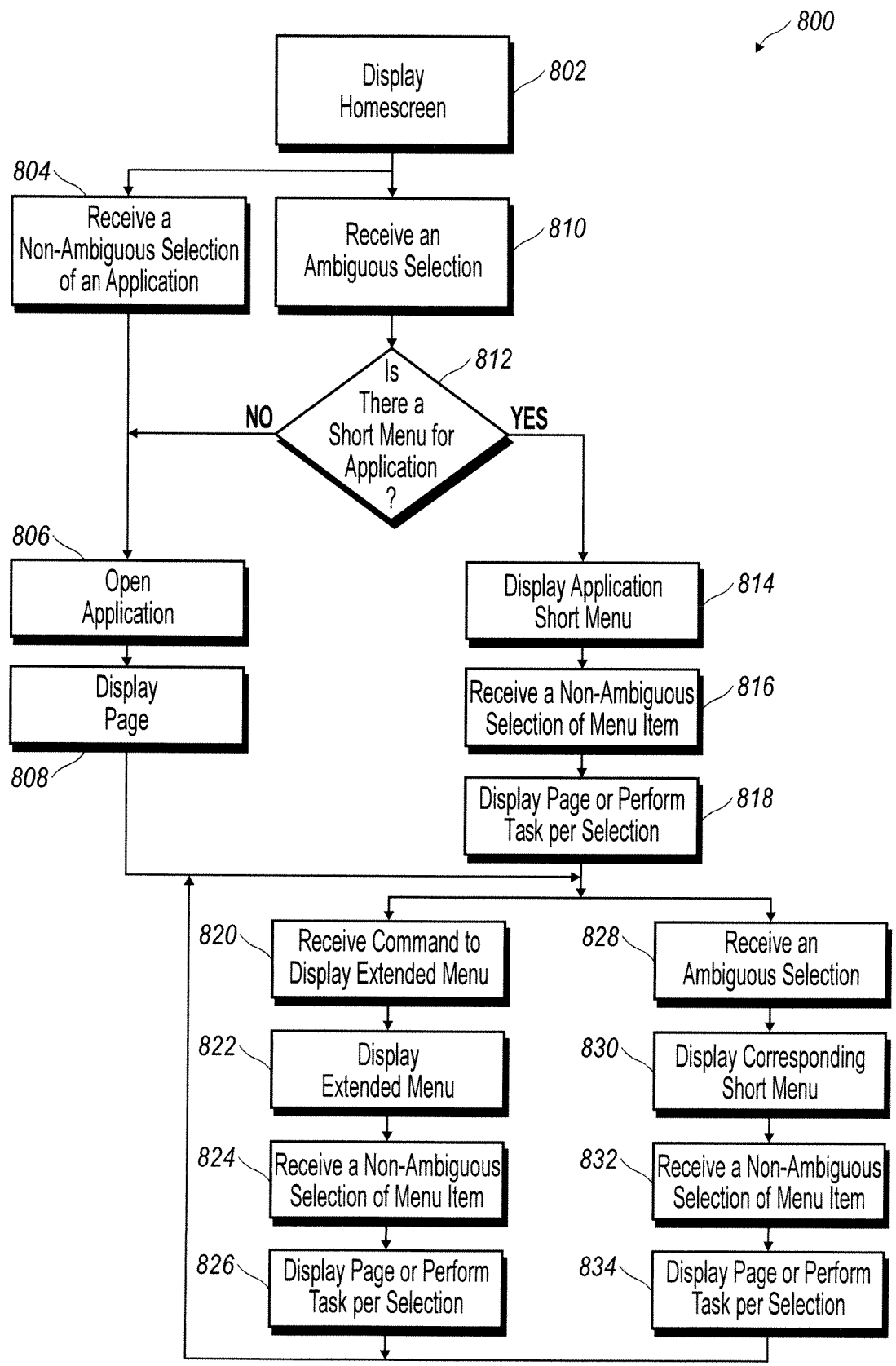
FIG. 6 is a flow chart representative of a hierarchical menu process.

FIG. 6 illustrates an exemplary method 800 for implementing a hierarchical menu with ambiguous selection on a handheld electronic device 300, PDA, or other similar device having a small display screen 322. The method 800 describes a hierarchical menu process that could continue well beyond the number of submenus that are discussed in the method itself. Thus, the extent of method 800 is not intended as a limitation. Rather, the extent of method 800 is intended to generally express the manner by which a hierarchical menu with ambiguous selection can be implemented in lesser and greater degrees of size and complexity.

Initially, a home screen 802 is displayed on the display screen 322. The user scrolls to a particular application using a navigation tool. The user can then depress the menu key 606 to initiate a non-ambiguous selection 804 of that particular application 358 that is received by the method 800. The method 800 then causes the selected application 358 to open an application 806 and display a page 808 on the display screen 322. Alternatively, the user can make an ambiguous selection 810. For example, if the navigation tool is a trackball 321 having a depressible rolling member, the user depresses the rolling member when no menu is present. The method 800 receives the ambiguous selection 810 and then must determine whether there is a short menu for this application 812. If there is no short menu 624, then the method 800 causes the application to open 806 and display a page 808. If there is a short menu 624, then the method causes the display of the applications short menu 814. The user then scrolls to the desired menu item and depresses the rolling member. The method 800 receives a non-ambiguous selection of the menu item 816 and either displays a page or causes the computer to perform the task selected 818.

Once a page is displayed 808, 818, the user again has two choices. The user can depress the menu key 606 and the method 800 receives a command to display an extended menu 820 corresponding to the displayed page. The method 800 then displays that extended menu 822. The user then scrolls to a particular menu item and depresses the rolling member which causes the method 800 to receive a non-ambiguous selection of the menu item 824. The method 800 then displays a page or performs the task per the selection 826. Alternatively, the user can depress the rolling member with no menu displayed causing an ambiguous selection 828. The method 800 receives this ambiguous selection 828 and causes the display of a corresponding short menu 830, or the method 800 can be programmed to perform a particular task that is the most common for the displayed page (not shown in FIG. 6). With the short menu 624 displayed, the user can then scroll to the desired menu item and depress the rolling member to generate a non-ambiguous selection. The method 800 receives the non-ambiguous selection of the menu item 832 and causes the display of a page or performance of a task per the selection 834.

If the user is presented with another displayed page, the user can repeat steps 820 through 826 or 828 through 834, depending on whether the user uses an extended menu 618 or short menu 624, respectively.

Once the particular activity is completed, the user can use the back key 608 to navigate back through the various pages displayed until the user reaches a page from which the user can perform another activity or select another application 358 upon reaching the home screen 802. The device can be equipped with an escape key to go to the home screen 802 directly. Alternatively, an ambiguous selection to display a short menu or a non-ambiguous selection can be made to display a short or extended menu that has a home screen menu item.

Applications of the short menu 624 described above in relation to email can take the form of the several embodiments described hereinbelow. One embodiment takes the form of a handheld electronic device 300 that is programmed to display, upon user request, an abbreviated menu 624 of user-selectable actions 1000 relative to a page on the display screen 322 of the device 300. The abbreviated menu 624 addressed in the following embodiment(s) has also been described as a short menu 624, the details of which are further explained below. In these regards, a user-selectable action 1000 refers to an action that the user wishes to be taken relative to the displayed page, for example saving the page. This user-selectable action 1000 can be, for example, indicated by the user through the actuation of an auxiliary input device 328 such as a trackball 321 or thumbwheel.

Handheld electronic devices 300 are designed to have a user interface that accommodates cursor navigation on a particular page inside one of the various applications running on the handheld electronic device 300. Some examples of programs 358 that these devices 300 feature include but are not limited to an email program, an address book 352, a task manager, a calendar, a memo pad and a browser. Some applications, such as the task manager, may feature forms that can be filled with information entered by the user. Other programs, such as the browser, may display data from a remote source.

In order to navigate the displayed page, an auxiliary user input device 328 is provided on the device 300. This auxiliary user input device 328 can be a navigation tool including a trackball 321, thumbwheel, navigation pad, cursor keys and the like. These auxiliary user input devices 328 allow the user to navigate and make selections/requests.

Figure 7:
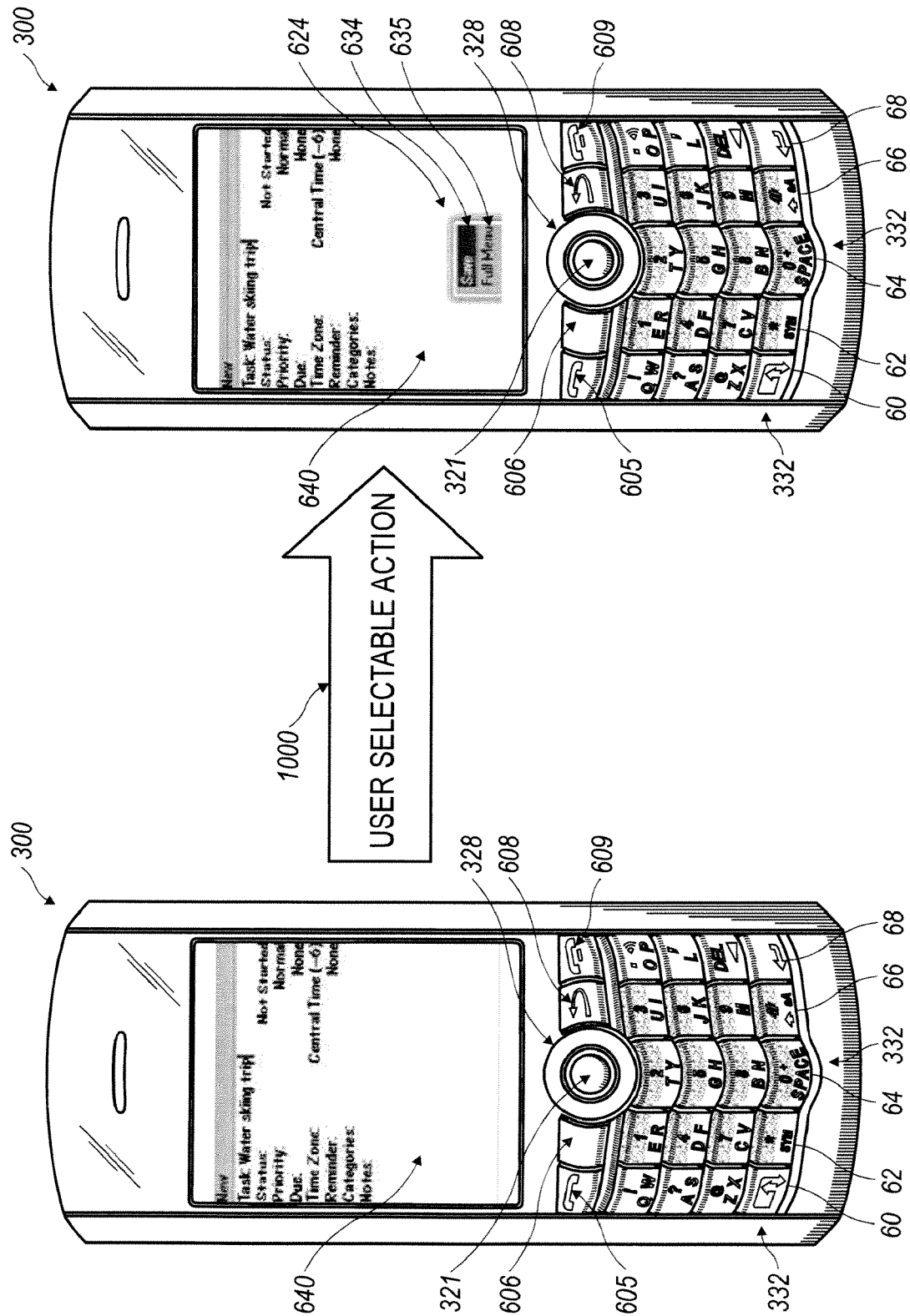
FIG. 7 depicts an expedited menuing system on a handheld electronic device in which a short or abbreviated menu pops-up showing a listing of one menu item the user may desire to perform.

As a general starting point, a cursor-navigable page is displayed on the display screen 322 of the handheld electronic device by an application 358 running on the device 300 and the user initiates an ambiguous request corresponding to the displayed page. One exemplary cursor-navigable page is shown in FIG. 7.

In one embodiment, the user of the handheld electronic device 300 initiates the ambiguous request through the use of an auxiliary user input device 328. The auxiliary user input device 328 can be one of the navigation tools, such as the trackball 321, described above.

As described above, the handheld electronic device 300 contains a microprocessor 338. This microprocessor 300 has a control program, such as an operating system 408 for the device 300 associated therewith for controlling operation of the handheld electronic device 300. The control program is configured to process an ambiguous request for the display of menu options associated with the displayed page based upon detection of a user menu request. The ambiguous request, as described above, occurs when there are multiple actions that a user is capable of taking. The control program can determine whether the request is ambiguous depending upon cursor position, such as in this case where a cursor is on the screen-displayed page. An example of detection of a user menu request by the control program is when the user depresses/actuates the trackball 321 thereby indicating a request for a list of menu options.

Once the detection of the user menu request has been made, the microprocessor 338 displays an abbreviated menu 624 having a short list 624 of menu options which is a subset of a full menu 618 of options of user-selectable actions 1000 available relative the screen-displayed page. The user-selectable actions 1000 of the short list 624 of menu options are those options that have been assessed to have a higher probability for being user-selected than at least some of the user-selectable actions 1000 of the full menu 618 of options that are not included in the short list 624 of menu options. Thus, the short list 624 contains items that a user of the handheld electronic device 300 is more likely to use than some of the items shown on the full or extended menu 618. Further details regarding the selection of those items for a short menu 624 are provided above.

In at least one embodiment, the short list 624 of menu options that are displayed when the user makes the menu request comprises one menu item 634 and optionally a full menu item 635. The one menu item 634 is a menu item that has been assessed as the most likely user desired menu item from the full menu 618. The full menu option 635 allows the user to request a full or extended menu 618. In another embodiment, the short list 624 of menu options consists of one menu item 634 while in yet another embodiment, full menu 635 is added to this closed listing of possible actions. In yet another embodiment, the short list 624 of menu options consists of save while in yet another embodiment, full menu 635 is added to this closed listing of possible actions The one menu item 634 as mentioned above is determined based upon the particular application running on the device 300 and in some embodiments additionally based upon cursor position on the cursor-navigable page. As an example, in a task application 640 once the desired information has been entered into the form presented on the screen 332 the user would like normally like to save the entry. Thus, the one menu item 634 in this scenario would be 'save'. Optionally, the 'full menu' 635 is presented as well and enables the user to request the full or extended menu 618. Additionally, other single menu items 634 can include paste, close, and open. Like the save and other one menu items they can be supplemented with a full menu option 635. The one menu item aids the user when performing specific tasks that the user would like to have additional feedback from or control over. For example, when the one menu item is a save item, the user would like some confirmation that the document, file, or object was saved. Additionally, when the close item is the one menu item, the user will be taken to a different program or location on the user interface and would like to be informed that such action is about to take place.

In at least one embodiment, the short menu 624 is sized so that it fills a substantial entirety of the display screen 322. In yet another embodiment, the short menu 624 is sized so that it overlaps the displayed page on the display screen 322. The size of the short menu 624 in relation to the display screen 322 can change depending upon the size of the display screen 322. When the device 300 is sized as described below, the short menu 624 often fills a large portion of the display screen 322. The amount of the display screen 322 that the short menu 624 occupies is contemplated to preferably range between 10% and 70%. Other sizes can also enable the user to be used that easily read the menu 624, 618 while still being able to see the underlying data displayed on the screen 322 as well. While in another embodiment, the abbreviated menu 624 is displayed on the screen 322 in place of the displayed page.

In order to facilitate entering of text associated with the displayed page and the like, a keyboard 332 is located below the display screen 322 and configured to accommodate textual input to the handheld electronic device 300. This keyboard 332 can either be a full or reduced keyboard as described below. Furthermore, a navigation tool in one embodiment is located essentially between the keyboard 332 and the display screen 322 of the handheld electronic device 300. This navigation tool can be an auxiliary input device 328 including those mentioned above. The navigation tool can further be advantageously widthwise centered on the face of the device 300.

Preferably, the handheld electronic device 300 is sized for portable use. In one embodiment the handheld electronic device 300 is sized to be cradled in the palm of the user's hand. The handheld electronic device 300 is advantageously sized such that it is longer than wide. This preserves the device's 300 cradleability while maintaining surface real estate for such things as the display screen 322 and keyboard 332. In a development of this embodiment, the handheld electronic device 300 is sized such that the width of the handheld electronic device 300 measures between approximately two and approximately three inches thereby facilitating the device 300 being palm cradled. Furthermore, these dimension requirements may be adapted in order to enable the user to easily carry the device.

Furthermore, the handheld electronic device 300 in an exemplary embodiment is capable of communication within a wireless network 319. Thus, the device 300 can be described as a wireless handheld communication device 300. A device 300 that is so configured is capable of transmitting data to and from a communication network 319 utilizing radio frequency signals. The wireless communication device 300 can be equipped to send voice signals as well as data information to the wireless network 319. The wireless communication device 300 is capable of transmitting textual data as well as other data including but not limited to graphical data, electronic files, and software.

Figure 8:
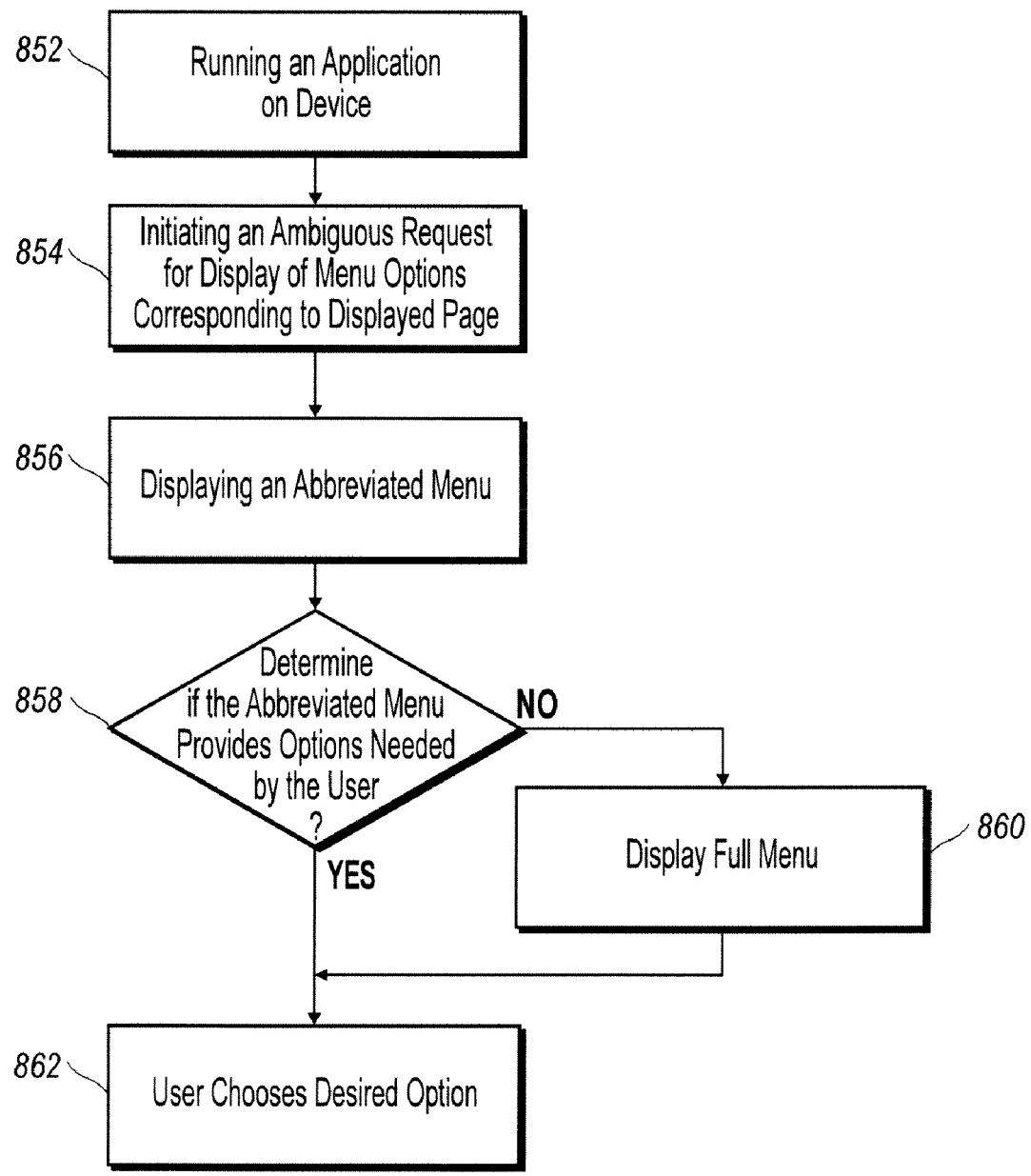
FIG. 8 further illustrates the hierarchical menu process depicted in FIG. 7.

Yet another embodiment takes the form of a method for causing, upon user request, the display of an abbreviated menu 624 having a short list of menu items on a display screen 322 of the handheld electronic device 300 when a currently running application 358 is presented on the display screen 322 of the device 300 as depicted in FIG. 8. First, the method includes running an application on a handheld electronic device and thereby causing display of a cursor-navigable page (block 852). Next, the method further involves initiating an ambiguous request for display of menu options corresponding to the displayed page (block 854). Furthermore, the method involves displaying an abbreviated menu having a short list of menu options (block 856). This short menu 624 as described above includes those options that have been assessed a higher probability for being user-selected than at least some of the user-selectable actions of the full menu 618. Thus, the short list 624 of menu options is a subset of a full menu 618 of options of user-selectable actions available relative to the displayed text entry page and the user selectable actions of the short list 624 of menu options having been assessed a higher probability for being user-selected than at least some of the user-selectable actions of the full menu 618 of options that are not included in the short list 624 of menu options.

In one embodiment, the short list includes one item 634 and optionally a full menu item 635. Then a determination is made whether the abbreviated menu provides options needed by the user (block 858). If the options needed by the user are not displayed then a full (long) menu having additional options is displayed (block 860). Once the appropriate menu options are displayed (block 858, 860), the user chooses the desired option (block 862).

In another embodiment, the short list 624 of the method consists of one item 634. In another example, the closed group further includes a full menu item 635, for expanding the listing of available action. In yet another embodiment, the short list 624 of the method consists of save and a full menu item 635.

In other embodiments, the method for causing display of a short menu 624 also includes the various features described above in relation to the handheld electronic device 300 embodiments. These various features include dimensional options, communication options, auxiliary input options and short menu 624 sizing as described above in relation to the handheld electronic device 300 embodiment.

Still another embodiment takes the form of a processing subsystem configured to be installed in a mobile communication device 300 comprising a user interface including a display 322 and a keyboard 332 having a plurality of input keys with which letters are associated. The processing subsystem serves as an operating system 408 for the incorporating device 300. The processing subsystem preferably includes a microprocessor 338 and a media storage device connected with other systems and subsystems of the device 300. The microprocessor 338 can be any integrated circuit or the like that is capable of performing computational or control tasks. The media storage device can exemplarily include a flash memory, a hard drive, a floppy disk, RAM 326, ROM, and other similar storage media.

As stated above, the operating system 408 software controls operation of the incorporating mobile communication device 300. The operating system 408 software is programmed to control operation of the handheld electronic device 300 and the operating system 408 software is configured to process an ambiguous request for display of menu options of user-selectable actions 1000 relevant to a currently running application 358 on the device 300 based upon detection of a user menu request. Based on the detection of the user menu request, the microprocessor 338 displays an abbreviated menu 624 having a short list 624 of menu options which is a subset of a full menu 618 of options of user-selectable actions 1000 of the short list 624 of menu options. The short list 624 of menu options have been assessed a higher probability for being user-selected than at least some of the user-selectable actions 1000 of the full menu 618 of options that are not included in the short list 624 of menu options.

In other embodiments, the processing subsystem also includes the various features described above in relation to the handheld device 300 embodiments. These various features include dimensional options, communication options, auxiliary input options and short menu sizing as described above in relation to the handheld electronic device 300 embodiment. Additionally, the options available from the short menu 624 are the same as those described above in relation to the method and handheld device 300 embodiments.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be affected using the thumb of the same hand in which the device 300 is held, however it is appreciated that additional control can be effected by using both hands. As a handheld device 300 that is easy to grasp and desirably pocketable, the size of the device 300 must be kept relatively small. Of the device's dimensions, limiting its width is important for the purpose of assuring cradleability in a user's hand. Moreover, it is preferred that the width of the device 300 be maintained at less than ten centimeters (approximately four inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face of the device 300, where it is most advantageous to include a display screen 322 that outputs information to the user. The display screen 322 is preferably located above a keyboard that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 332 during data entry periods.

To facilitate textual data entry into the device 300, an alphabetic keyboard is provided. In one version, a full alphabetic keyboard 332 is utilized in which there is one key per letter. In this regard, the associated letters can be advantageously organized in QWERTY, QWERTZ, AZERTY or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300. To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard 332 on the presently disclosed handheld electronic device 300. It should be further appreciated that the keyboard 332 can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device 300 preferably includes an auxiliary input that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball 321 which is easily utilized to instruct two-dimensional screen cursor movement in substantially any direction, as well as act as an actuator when the ball of the trackball 321 is depressed like a button. The placement of the trackball 321 is preferably above the keyboard 332 and below the display screen 322; here, it avoids interference during keyboarding and does not block the user's view of the display screen 322 during use (See FIG. 1).

In some configurations, the handheld electronic device 300 may be standalone in that it does not connect to the "outside world." As discussed before, one example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device 300 is significantly enhanced when connectable within a communication system, and particularly when connectable on a wireless basis in a network 319 in which voice, text messaging, and other data transfer are accommodated.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in a row of keys including a auxiliary input device 328. Additionally, the row of keys, including the navigation tool, preferably has a menu key 606 and a back key or escape key 608. The menu key 606 is used to bring up a menu and the escape key 608 is used to return to the previous screen or previous menu selection.

The handheld electronic device 300 includes an input portion 604 and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 9a. The QWERTZ keyboard layout is normally used in German-speaking regions; this alphabetic key arrangement 44b is shown in FIG. 9b. The AZERTY keyboard layout 44c is normally used in French-speaking regions and is shown in FIG. 9c. The Dvorak keyboard layout was designed to allow typists to type faster; this alphabetic key arrangement 44d is shown in FIG. 9d.

Alphabetic key arrangements are often presented along with numeric key arrangements. Typically, the numbers 1-9 and 0 are positioned in the row above the alphabetic keys 44, as shown in FIG. 9a-d. Alternatively, the numbers share keys with the alphabetic characters, such as the top row of the QWERTY keyboard. Yet another exemplary numeric key arrangement is shown in FIG. 10, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 11.

As shown in FIG. 11, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

FIGS. 11 and 12 both feature numeric keys arranged according to the ITU Standard E.161 form. In addition, FIG. 12 also incorporates alphabetic characters according to the ITU Standard E.161 layout as well.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. As exemplified in FIG. 1, a color scheme of the numeric phone keys has a two tone appearance, with the upper portion of the numeric keys being a first color and the lower portion of the numeric keys being a second color. The first color may be lighter than the second color, or darker than the second color.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 12. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 11 (no alphabetic letters) and 12 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

While several keyboard layouts have been described above, alternative layouts integrating the navigation tool into the keyboard are presented below. The key arrangements and mobile devices described herein are examples of a conveniently sized multidirectional navigational input key that is integrated with an alphanumeric key layout. The example multidirectional navigational input keys can be used in a navigation mode to move, for example, a cursor or a scroll bar. In an alphabetic or numeric mode, it can be used to enter numbers or letters. This dual feature allows for fewer and larger keys to be disposed on the keyboard while providing for a QWERTY, reduced QWERTY, QWERTZ, Dvorak, or AZERTY key layout and navigational input. These familiar keyboard layouts allow users to type more intuitively and quickly than, for example, on the standard alphabetic layout on a telephone pad. By utilizing fewer keys, the keys can be made larger and therefore more convenient to the user.

In some examples, keys in the middle columns are larger than keys in the outer columns to prevent finger overlap on the interior keys. As used herein, middle columns are all columns that are not on the outside left and right sides. The term "middle column" is not limited to the center column. It is easier for a user to press keys on the outer columns without their finger overlapping an adjacent key. This is because part of the user's thumb or finger can overlap the outside housing of the device, rather than other keys. Therefore, these outer column keys can be made smaller. The multidirectional navigational input device is provided in the center of the keypad and has a larger surface than the outside keys. The larger surface in the inner part of the keyboard helps prevent finger overlap.

In another example, a touchpad or rotatable rim is disposed about the periphery of the example multidirectional navigational input key. The rim or touchpad can be used as a secondary navigational device that acts in conjunction with the multidirectional navigational key. For example, the rim or touchpad could provide a third dimension of navigational input (with the multidirectional navigational input key providing first and second dimensions). The rim or touchpad can also function as a stand-alone, one or two dimensional, navigational input device.

Figure 18:
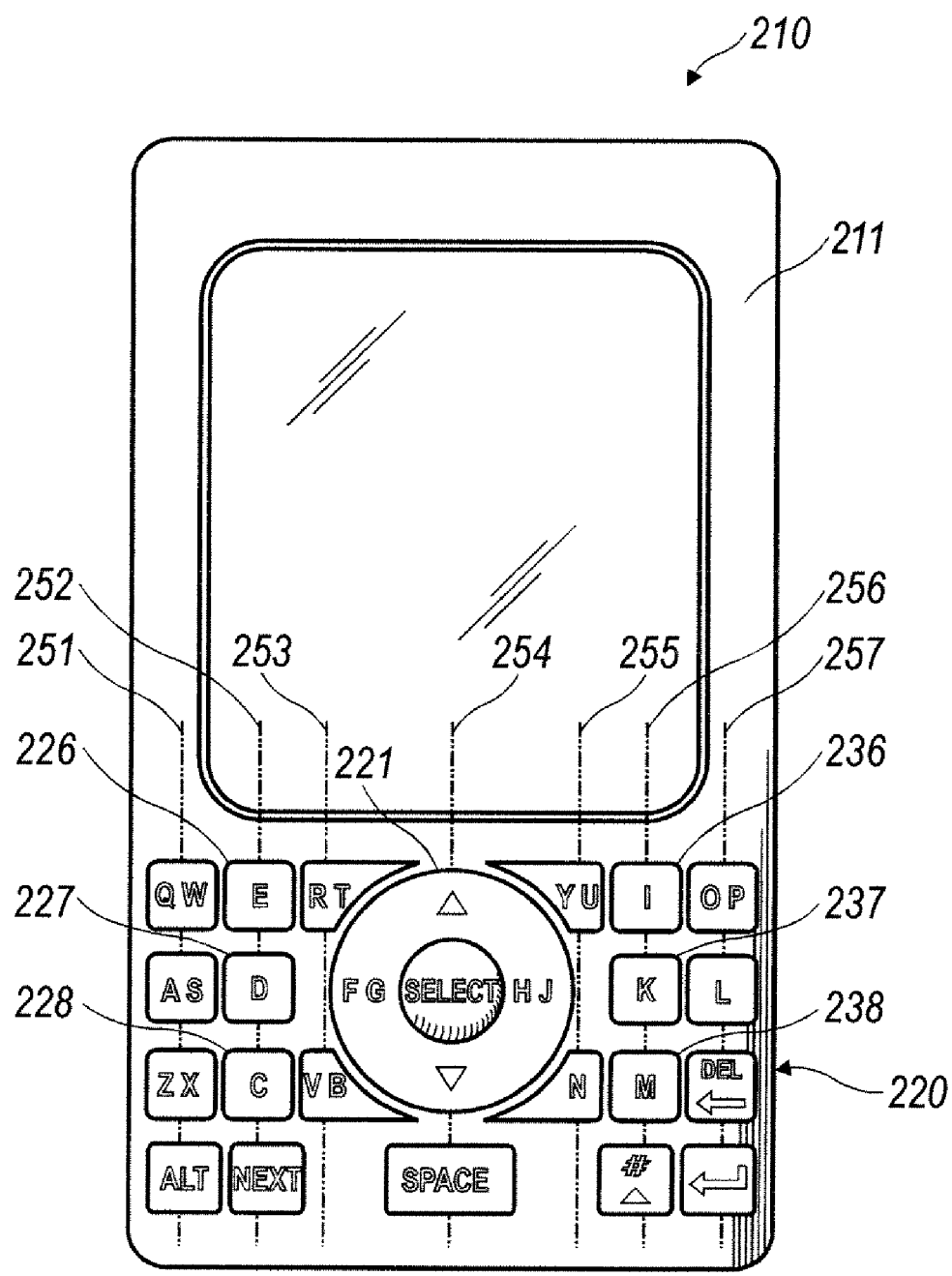
FIG. 18 is a front facing view of yet another example mobile device having yet another example key arrangement.
Figure 19:
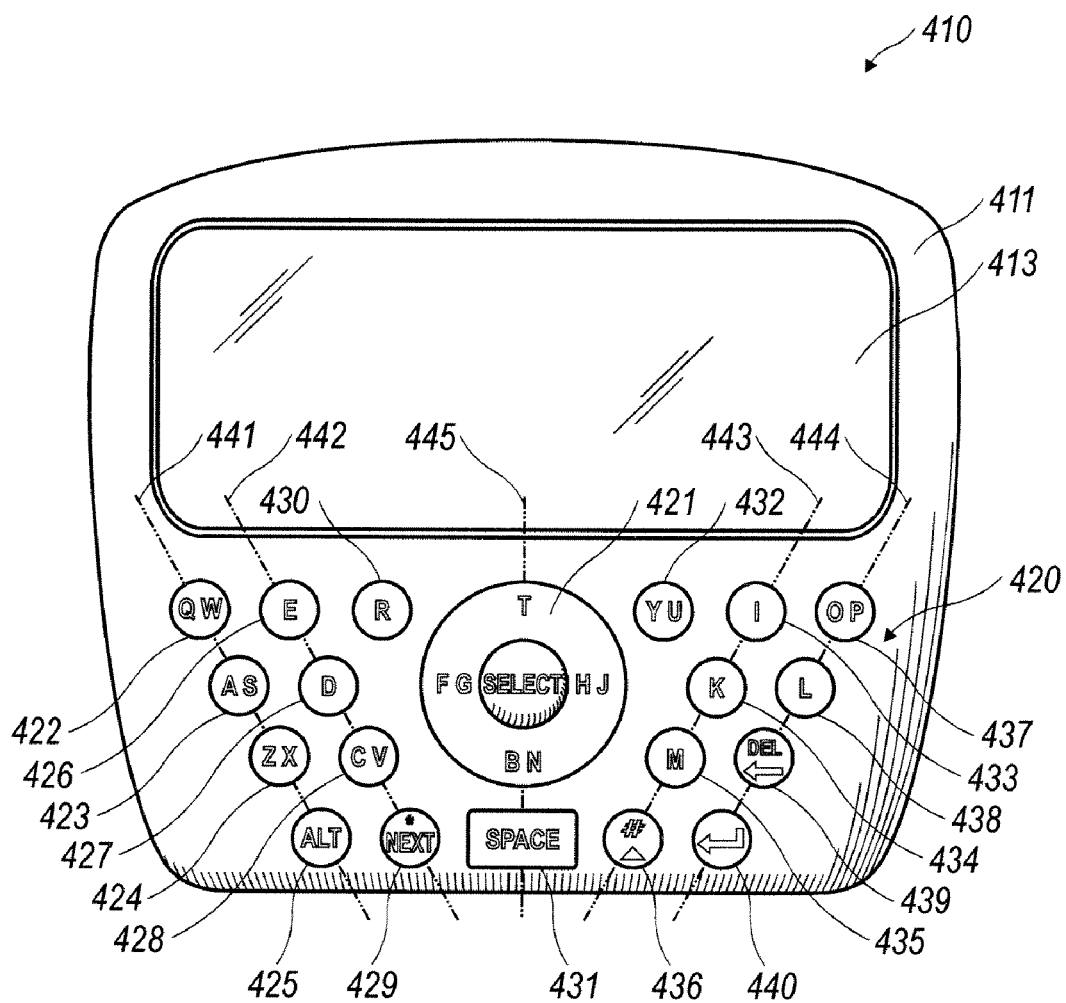
FIG. 19 is a front facing view of still another example mobile device having still another example key arrangement.
Figure 20:
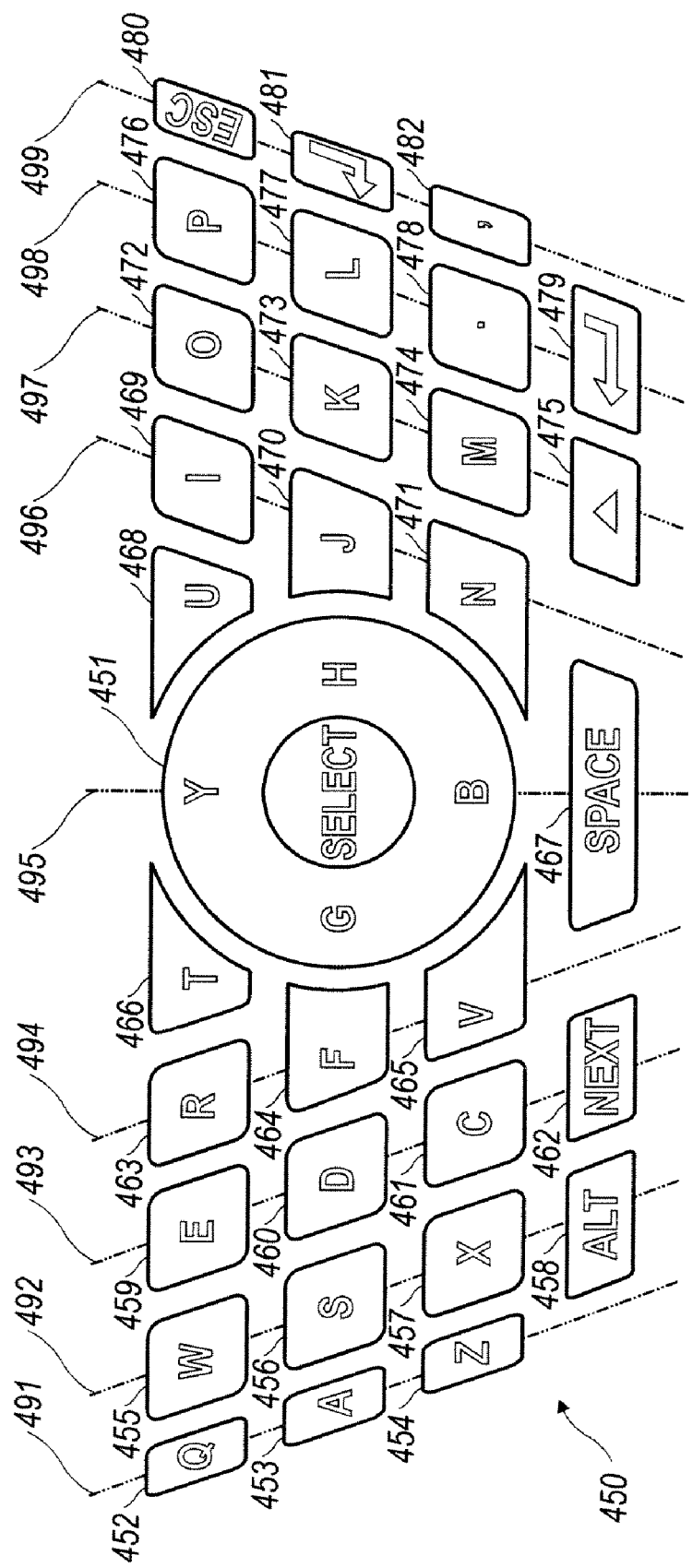
FIG. 20 is a front facing view of yet another example key arrangement.

With reference now to the drawings, FIGS. 16-22 depict numerous key arrangements for a keyboard. FIGS. 16-19, and 21 depict an example key arrangement on a mobile communication device while FIGS. 20 and 22 depict example key arrangements.

Figure 16:
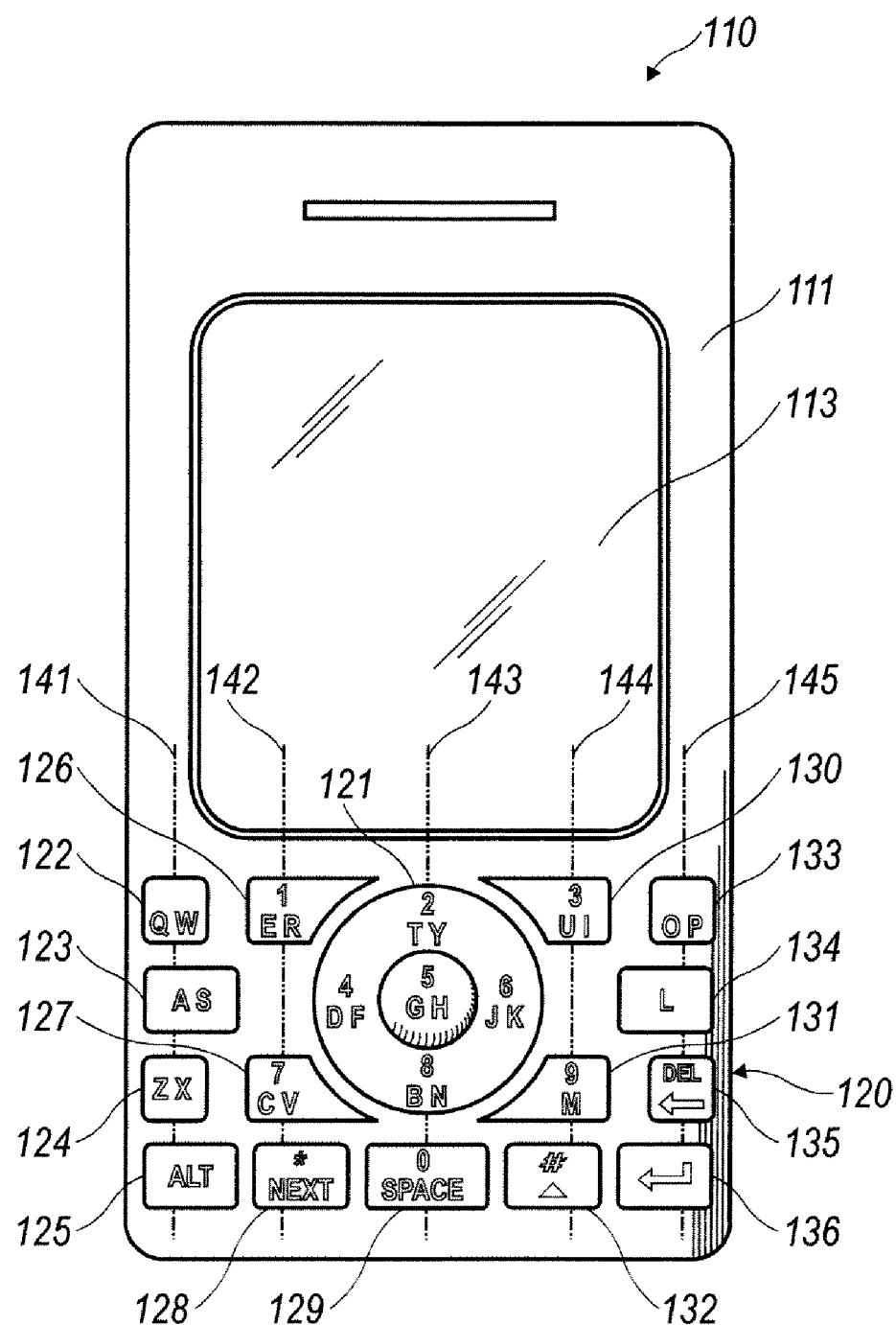
FIG. 16 is a front facing view of an example mobile device having a navigation tool within in a keyfield.

FIG. 16 depicts the front face of an example mobile device 110 with an example key arrangement 120. The mobile device 110 also includes a housing 111 and a display screen 113. The keys 121-136 are arranged in five columns 141-145 and four rows. The first and last columns 141, 145 have keys in each row. The second and fourth columns 142, 144, which are middle columns, have keys in three rows, with no keys present in the second row where the multidirectional navigational input key 120 has its greatest width. The keys in the second and fourth columns 142, 144 are chamfered or have an arcuate concavity on the side facing the multidirectional navigational input key 121 so that they can be located closely to the circular multidirectional navigational input key 121 and have a maximized key size. The center column 143, which is also a middle column, includes the multidirectional navigational input key 121, and a space bar 129 centered beneath it.

The alphabetic key layout is of a reduced column QWERTY type and is overlaid on the keys 121-124, 126-127, 130-131, and 133-134. The multidirectional navigational input key 121 is integrated into the layout. In this example, the upper, left, center, right, and lower areas of the multidirectional navigational input key 121 are labeled respectively with the alphabetic indicia "TY," "DF," "GH," "JK," and "BN." The remaining keys 125, 128, 132, 135, 136 have various functions, such as "alt," "next," "cap," "delete," and "enter."

A numeric phone pad key layout is also overlaid on the three middle columns 142-144. Numbers "2," "4," "5," "6," and "8" are disposed, respectively, on the upper, left, center, right, and lower areas of the multidirectional navigational input key 121. The remaining numbers ("1," "3," "7," and "9") and symbols (# and *) are disposed on the other keys 126-132 of the middle columns 142-144 in a manner consistent with the telephony keypad layout.

One of the keys, such as the "alt" key 125 in the bottom row of the first column 141 can be used to toggle between navigation, alphabetic, and numeric entry modes. In a navigation mode the multidirectional navigational input key 121 is operable to move a cursor or scroll bar in a graphical user interface display on the display screen 113. For example, pressing on a right side of the multidirectional navigational input key 121 will move a cursor to the right, and pressing on the bottom portion of the multidirectional navigational input key 121 will move the cursor down. The center portion of the multidirectional navigational input key 121 is a select key in this mode. Pressing the center area of the multidirectional navigational input key 120 triggers a selection. This is similar to a mouse "click." In alphabetic mode, the multidirectional navigational input key 121 is operable to input the alphabetic characters that are indicated on each area. For example, pressing a side surface of the multidirectional navigational input key 121 will enter the character "D" or "F" depending on the predictive text recognition or manual selection.

Figure 17:
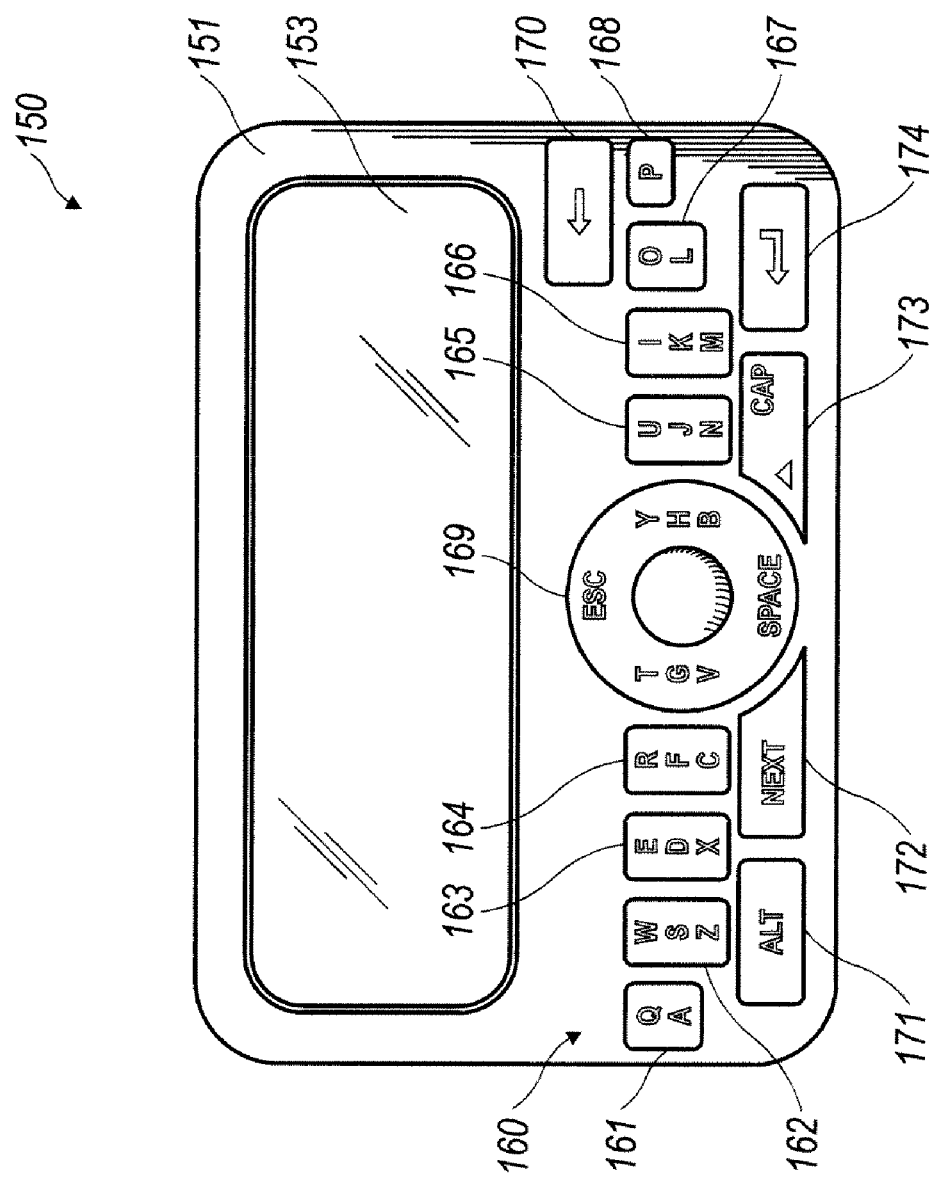
FIG. 17 is a front facing view of another example mobile device having another example key arrangement.

FIG. 17 depicts the front face of another example mobile device 150 with an example key arrangement 160. The mobile device 150 also has a housing 151 and a display screen 153. The multidirectional navigational input key 169 is located approximately in the middle of keys 161-164 (on the left side) and 165-168 (on the right side). Other keys 170-174 are also located on the front of the housing 151 on a bottom row beneath the keys 161-168. Keys 172 and 173 have a chamfered corner or an arcuate concavity on the side facing the multidirectional navigational input key 169 so that they will fit closer to the circular multidirectional navigational input key 169. Key 170 is located above the keys 167 and 168.

The alphabetic key layout is of a reduced-row QWERTY type and is overlaid on the keys 161-169. Two sides of the multidirectional navigational input key 169 are integrated into the reduced-row QWERTY layout. Each key 161-164 and 165-168 and the left and right sides of the multidirectional navigational input key 169 are associated with one of the ten columns of letters in a QWERTY keyboard layout. Starting with key 161, which is associated with the letters "QA," keys 161-164 are successively associated with the next column of the QWERTY keyboard. The left side of the multidirectional navigational input key 169 is associated with the letters "TGV" and the right side of the multidirectional navigational input key 169 is associated with the keys "YHB." Keys 165-168 are also successively associated with the remaining columns of the QWERTY keyboard. Keys 161 and 167 are only associated with two letters each, and key 168 is only associated with one letter. Accordingly, these keys are shorter in height than the other keys that have three letters associated with them. This shortened height provides at least two benefits: (1) a user may more easily select the keys labeled 163, 166, and 167, without accidentally depressing an unwanted key, because part of these keys have an adjacent space that is not occupied by another key; and (2) because these keys 161, 167, and 168 have a different shape from the other alphabetic entry keys 162-167, they may be more easily discernable by touch.

The multidirectional navigational input key 169 also has other areas that are utilized in alphabetic mode. The bottom portion is associated with a space bar function; the top function is associated with an "escape" function; and the center portion is associated with a select function. The center area of the multidirectional navigational input key 169 is labeled "select," to denote that it has select function as described above. In other embodiments, the select key can be replaced by a trackball that functions as a select key as well as a navigation device. This trackball would present an alternative navigation tool that could be used to direct cursor navigation on the screen as well as make selections. The other select functions described below could be implemented using a key or trackball. The remaining keys 170-175 have various functions, such as "alt," "next," "delete," and "enter." The multidirectional navigational input key 169 operates in an alphabetic and navigational mode as described above.

FIG. 18 depicts yet another example mobile device 210 that is similar to the example mobile device 110 and key arrangement 120 of FIG. 16. The third example mobile device 210 differs in that the housing 211 is wider and the key arrangement 220 has two additional middle columns 252 and 256 that each contain three additional keys 226-228 and 236-238. The key layout, which includes columns 251-257, is still a reduced column QWERTY keyboard but is different in that fewer keys have two letters and more keys have single letters. This example key arrangement 220 requires more space than the first example key arrangement 120, but provides more keys that are devoted to a single letter. This increases the performance of the alphabetic input through the predictive text system, or, alternatively, decreases the number of times a user would have to manually press a key twice to input the second associated key, depending on which mode the device is in.

The multidirectional navigational input key 221 in the third example device 210 only uses the left and right side portions for text entry. The top and bottom portions are used only for up and down navigational input in both modes. This allows the user to be able to navigate a cursor up and down or scroll up and down in a graphical user interface while remaining in the alphabetic entry mode. This example key arrangement 220 could be used in conjunction with another one-dimensional input device, e.g. a thumbwheel, to obtain two dimensional cursor movement while in the alphabetic entry mode.

FIG. 19 depicts still another example mobile device 410 with a key arrangement 420. The multidirectional navigational key 421 is situated in the center column 445 between two columns on each side 441-442, 443-444, and an extra key in the first row from the top on each side 430, 432. The four columns located to the left and right sides of the multidirectional navigational key 421 angle inwardly toward the bottom of the middle column 445. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. The keys in the first and last columns 441, 444 are positioned near the sides of the housing face 411. The angled inward design simulates that of a standard QWERTY keyboard, thereby enhancing user familiarity with the keyboard. It also provides a better ergonomic positioning for the thumbs to access the keys, as it is generally more difficult for a user to reach the lower corners of a key arrangement that is on a hand-held device and is thumb activated. All the keys 422-440 are round except for the space bar 431.

The alphabetic key layout is a reduced column QWERTY type and is overlaid on the keys 421-424, 426-428, 430, 432-435, 437, and 438. The multidirectional navigational input key 421 is integrated into the layout. In this example, the upper, left, right, and lower areas of the multidirectional navigational input key 421 are respectively labeled with the alphabetic indicia "T," "FG," "HJ," and "BN." The center area of the multidirectional navigational input key 421 is labeled "Select," to denote that it has the select function as described above. A space bar 431 is centered underneath the multidirectional navigational input key 421 in the middle column 445. The remaining keys 425, 429, 436, 439, 440 have various functions, such as "alt," "next," "delete," and "enter." The multidirectional navigational input key 421 operates in an alphabetic and navigational mode as described above.

FIG. 20 depicts yet another example key arrangement 450 that is overlaid with a modified full-QWERTY layout. The layout is a full QWERTY because there is a separate key or surface of a key for each letter of the alphabet. In this example key arrangement 450 there are nine columns 491-499 with two or more keys, and two extra keys 466, 468 in the upper row to the left and right side of the multidirectional navigational input key 451. Twenty-three of these keys are used for alphabetic input 451-457, 459-461, 463-466, 468-474, 476-477. The multidirectional navigational input key 451 is approximately centered in the middle of the key arrangement 450. There are four key surfaces on the left, right, upper, and lower areas of the multidirectional navigational input key 451. These surfaces may be indentations, protrusions, or flat. This brings the total number of keys or key surfaces that are used for alphabetic input to twenty-six. A fifth key surface is also present in the center of the multidirectional navigational input key 451, and is used for a select function in this example. The six keys 464, 465, 466, 468, 470, 471 to the left and right of the multidirectional navigational input key 451 are chamfered or have an arcuate concavity on the side facing the multidirectional navigational input key 451 so that they can be located closely to the circular multidirectional navigational input key 451 and maximize key size.

The keys in the first and last columns 491, 499 are positioned near the left and right side of the key arrangement 450. The first and last columns 491, 499 have keys that are smaller in width than the keys in the middle columns 492-498 and the two extra keys 466, 468. This key arrangement 450 is designed so that the first and last columns 491, 499 of the key arrangement 450 are positioned near the sides of a device, such that the user's thumbs or fingers will more easily contact the smaller peripheral keys. Because the outer column keys are smaller, the keys in the middle columns 492-498 may be made larger. This is particularly beneficial for a keyboard for a device with size constraints. The eight columns located to the left and right sides of the multidirectional navigational key 451 angle inwardly toward the bottom of the middle column 451. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. This provides the same benefit discussed above in the description of FIG. 19.

The alphabetic key layout is of a full QWERTY type and is overlaid on the keys 451-457, 459-461, 463-466, 468-474, 476-477. The multidirectional navigational input key 451 is integrated into the layout. In this example, the upper, left, right, and lower areas of the multidirectional navigational input key 451 are respectively labeled with the alphabetic indicia "Y," "G," "H," and "B." The center area of the multidirectional navigational input key 421 is labeled "Select," to denote that it has a select function as described above. A space bar is centered underneath the multidirectional navigational input key 451 in the center column 495. The remaining keys 458, 462, 467, 475, 478-482 have various functions, such as "alt," "next," "delete," and "enter." The multidirectional navigational input key 451 operates in an alphabetic and navigational mode as described above.

Figure 21:
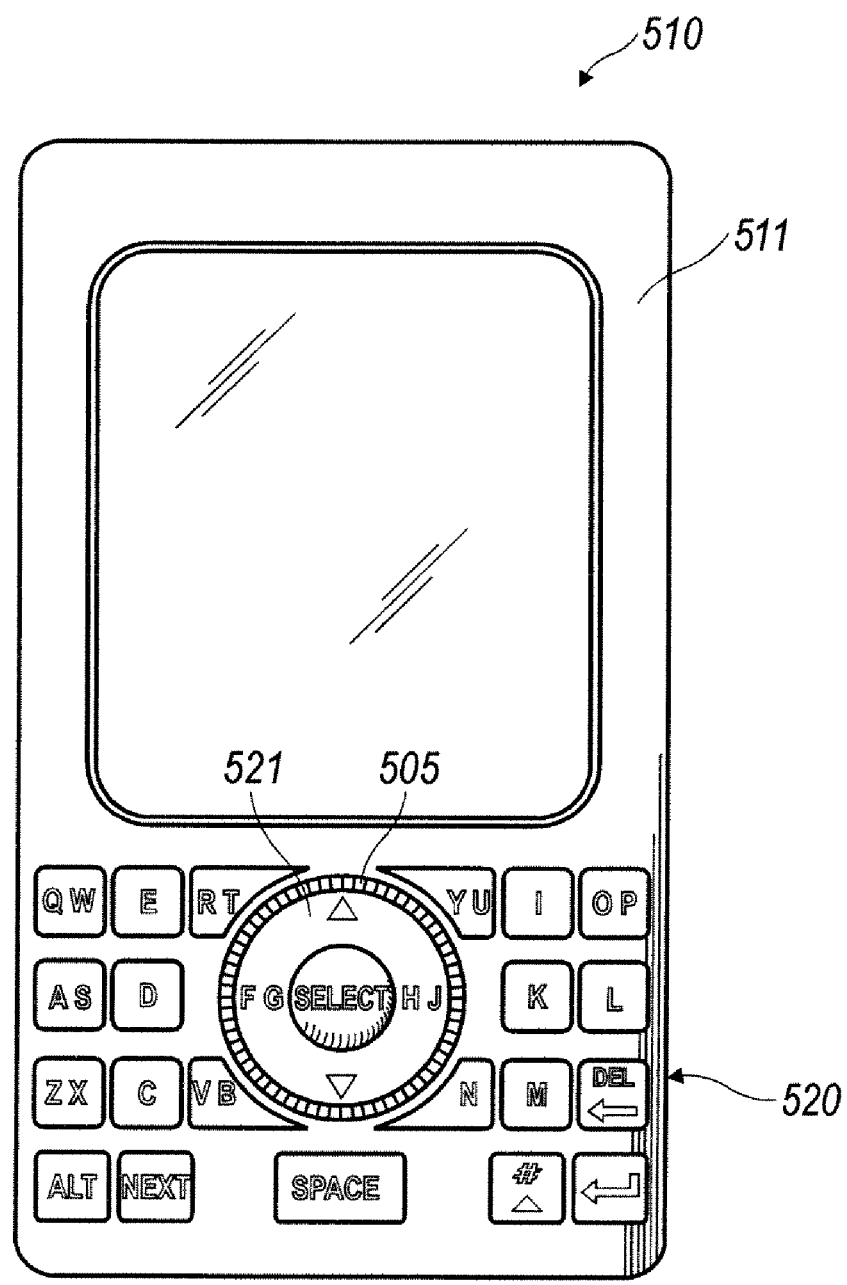
FIG. 21 is a front facing view of still another example mobile device having still another example key arrangement.

FIG. 21 depicts another example mobile device 510 having an example key arrangement 520. The key arrangement 520 and reduced column QWERTY layout are similar to that of the example mobile device 210 and key arrangement 220 depicted in FIG. 18, however, the example mobile device 510 and key arrangement 520 has a raised rotatable rim 505 disposed about the periphery of the multidirectional navigational input key 521. The surface of the rim 505 is enhanced to provide a gripping surface for a thumb or finger. In this example there are indentations spaced periodically about the rim. Other examples may instead have protrusions or a rubbery surface to better enable the user's thumb or finger to grip the rim and rotate it. Other gripping surfaces are also possible. The rim 505 can freely rotate in 360 degrees, and in some examples it can be depressible. The rim 505 may be coupled to the multidirectional navigational input key 521 or may instead be coupled to the housing 511. The rim 505 can be rotatable independently of the multidirectional navigational input key 521. The rim 505 can be very thin to minimize the space it occupies on the face of the housing 511, or it can be thicker to provide an optimal gripping surface.

The rotatable rim 505 functions as either a stand-alone, two-dimensional input device, a stand-alone, single-dimensional input device, or a supplemental device for inputting a third navigational input. The user can select which way they want the rim 505 to function or it can be factory preset to only one mode.

As a stand-alone navigation device, the rim 505 is operable to input one- or two-dimensional navigation signals to the processor. For example, in a single-dimension mode, rotating the rim 505 moves a cursor or scroll bar up or down in a graphical user interface. For example, rotating the rim 505 in the clockwise direction would scroll the page down, and rotating it counter-clockwise would scroll the page up.

In a two-dimensional mode, pressing the rim 505 down at a certain location would move a cursor in the same direction on the graphical user interface. Stated another way, pressing the rotatable rim at a location relative to the center of the rim causes a corresponding navigational input relative to the center of the graphical user interface. For example, pressing the rim 505 on the left side would move the cursor left. The rim 505 could be rotated while pressed down to a different location and the cursor would change its movement accordingly. For example, if while pressing down on the rim 505, the user rotates the rim 505 from the left side to the upper side of the rim 505, this would cause the cursor to go from moving left, to diagonally left and up, to straight up on the graphical user interface. This operational mode could also be used to control one or two scroll bars, among other navigational devices.

The rotatable rim 505 could also be used in conjunction with the multidirectional navigational input key 521 to provide a third navigation dimension. For example, the rim 505 could operate to move a scroll bar, like a finger-wheel on a mouse. Rotating the rim 505 counter-clockwise would move the scroll bar up, and rotating the rim 505 clockwise would move the scroll bar down, or vice-versa. Other applications running on an electronic device with a graphical user interface could also benefit from using the rim 505 to navigate in a third-dimension. For example, the rotatable rim 505 could beneficially provide a third dimensional input in a three-dimensional graph or game.

FIG. 22 depicts still another example key arrangement 720 that is overlaid with a reduced column QWERTY layout. There are four columns 741, 742, 744, and 745 with four keys, a center column with the multidirectional navigational input key 721 and space bar 731, and two extra keys 730, 732 in the upper row to the left and right side of the multidirectional navigational input key 721. The four columns 741, 742, 744, and 745 are angled toward the bottom part of the center column 743. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. This angled arrangement imparts the benefits described above in reference to the key arrangement 420 of FIG. 19.

The keys in the middle columns 742-744 and the extra keys 730, 732 are also larger in total front surface area than the keys in the outer columns 741, 745. This imparts the benefits described above in reference to the key arrangement 450 of FIG. 20. The six keys surrounding the multidirectional navigational input key 721 have an arcuate concavity on the side facing the multidirectional navigational input key 721 so that they can be located closely to the circular multidirectional navigational input key 721 and maximize key size. A circular touchpad 705 is disposed around the periphery of the multidirectional navigational input key 721 and is described in detail below.

A reduced column QWERTY layout is overlaid on the example key arrangement 720. The multidirectional navigational input key 721 is integrated into the QWERTY layout along with the other alphabetic entry keys 722-724, 726-728, 730, 732-735, 737-739. Three keys 722, 723, 724 are associated with two letters in the first column 741. One key 737 in the first row of the last column 745 is associated with two letters. The multidirectional navigational input key 721 has five labeled areas. The upper, left, right, and lower areas of the multidirectional navigational input key 721 are associated with the letters "TY," "FG," "HJ," and "B." A center area of the multidirectional navigational input key 721 is labeled "Select," to denote that it has the select function described above. The space bar 731 is centered beneath the multidirectional navigational input key 721. The remaining keys on the bottom row 725, 729, 736, 740 have various functions, such as "alt," "next," "delete," and "enter." The multidirectional navigational input key 721 operates in an alphabetic and navigational mode as described above.

In this example key arrangement 720, the circular touchpad 705 is disposed around the periphery of the multidirectional input key 721. When the example key arrangement 720 is employed in an electronic device, the touchpad 705 is configured to detected a finger touch on the touchpad 705, and correspondingly input a navigational signal to a processor to move a cursor, scroll bar, or some other navigational device on a graphical user interface. The circular touchpad 705 operates in much the same way as the rotatable rim 505 described above: it can be used as a stand-alone navigation device to provide single- or two-dimensional input to the processor, or it can be used in conjunction with the multidirectional navigational input key 721. A user can select which of these operational modes they desire the touchpad 705 to operate in, or it can be factory preset to operate in only one mode.

For an example of a single-dimensional input, the touchpad 705 may be configured to cause a cursor or scroll bar to move up and down a graphical user interface when a user brushes their finger or thumb across the touchpad 705.

In a two-dimensional mode, pressing the touchpad 705 at a certain location would move a cursor in the same direction on the graphical user interface. Stated another way, pressing the touchpad at a location relative to the center of the touchpad causes a corresponding navigational input relative to the center of the graphical user interface. For example, pressing the touchpad 705 on the left side would move the cursor left. The user could move their finger or thumb along the circular touchpad 705, and this would change the navigational movement accordingly. For example, if the user touches the touchpad 705 on the left side and moves their finger from the left side to the upper side of the touchpad 705, this would cause the cursor to go from moving left, to diagonally left and up, to straight up on the graphical user interface. This operational mode could also be used to control one or two scroll bars, among other navigational devices.

The touchpad 705 could also be used in conjunction with the multidirectional navigational input key 721 to provide a third dimension of navigation. For example, a brushing motion on the touchpad 705 could operate to move a scroll bar like a finger-wheel on a mouse. Brushing the touchpad 705 counter-clockwise would move the scroll bar up, and brushing the touchpad 705 clockwise would move the scroll bar down, or vice-versa. The multidirectional navigational input key 721 would, at the same time, be operable to move a cursor in two directions. Other applications running on an electronic device with a graphical user interface could also benefit from using the touchpad 705 for a third dimensional navigational input device, as explained above in the description of the rotatable rim 705.

Regarding all the example key arrangements, other keys could be added to these examples, or the function of the keys could be different. In addition to the letters, numbers, and symbols shown, the keys may further include symbols and functions that are typically utilized with keyboards. Example symbols include ".", ",", ";", """, "'", ":", "?", "/", ">", "<", "!", "@", "~", "$", "%", "^", "&", "(", ")", "_", "-", "+", "=", "[", "]", "{", "}", "|", and "\", among other known symbols. Example functions include "tab," "caps lock," "shift," "control," "alt," "return/enter," "backspace," "insert," "delete," "home," "end," "page up," "page down," "end," "escape," "pause," "break," "send," "end," "txt," "sym," and "scroll lock," among other known functions associated with text entry or telephony entry.

A variety of shapes are shown for the keys in the various embodiment. Other shapes may also be utilized, without limitation. In several of the example key arrangements, the keys in the first and last columns are shown as having a smaller size than the keys in the middle columns. In addition, for key arrangements that are positioned at the bottom of a mobile communication device, it may be desirable to have the keys in the bottom row have a smaller size than the keys in the upper rows. The keys in the bottom row are preferably positioned near the bottom edge of the face of the housing of the mobile communication device such that the same principals of usage apply and the keys are easier to access because of their proximity to the edge of the device. Alternatively, for a device where the keyboard is positioned at the top of the housing, the top row may have keys that are smaller in size than keys in the lower rows of the key arrangement.

Exemplary embodiments have been described hereinabove regarding both handheld electronic devices 300, as well as the communication networks 319 within which they cooperate. Again, it should be appreciated that the focus of the present disclosure is enhanced usability of today's more sophisticated wireless handheld communication devices 300 taking into account the necessary busyness of the front face real estate of these more compact devices that incorporate additional user interfaces.

What is claimed is:

1. A handheld wireless communication device configured to send and receive text messages and configured to send and receive voice communications, said device comprising:
   a hand cradleable, elongate body configured to be held in one hand by an operator of said device during text entry;
   a display located on a front face of said elongate body and upon which information is displayed to the operator during text entry;
   a key field located on the front face of said elongate body, said key field being composed of a plurality of keys selected from a plurality of alphanumeric input keys and at least one menu key;
   a navigation tool located on the front face of said elongate body;
   said alphanumeric input keys comprising a plurality of alphabetic keys having letters associated therewith and said letters, in a top row of said alphabetic keys, comprising in consecutive order the letters Q, W, E, R and T;
   a microprocessor configured to receive operator commands from said alphanumeric input keys, said menu keys and said navigation tool and to affect corresponding changes to the display;
   said elongate body has a length greater than a width thereof and said display, said key field and said navigational tool are located in series along said length of said elongate body; and
   a plurality of keys of said key field are substantially arranged in rows and columns, a top key in a column adjacent to the navigation tool has an edge conformance fitting to a boundary about the navigation tool and each key in that column is offset below the other keys in each associated row, with each key in the column adjacent to the navigation tool has substantially the same shape which is a different shape compared to the shape of keys in the other columns,
wherein at least one key of said key field is positioned adjacent to said navigation tool is a menu key that upon actuation displays an available action menu on said display, said at least one key has a circular arc-shaped edge conformance fitting to a circular arc-shaped boundary about said navigation tool and two call keys oppositely and laterally flank said navigation tool, one of said two call keys being a call initiation key and the other being a call termination key;
wherein said display, said navigational tool, and said key field are consecutively ordered along a lengthwise longitudinal-axis of said elongate body.

2. The handheld wireless communication device as recited in claim 1, wherein each of said display, said key field and said navigational tool is substantially width-wise centered on said elongate body.

3. The handheld wireless communication device as recited in claim 1, wherein said letters associated with said alphabetic keys are arranged in a QWERTY layout.

4. The handheld wireless communication device as recited in claim 1, wherein said letters associated with said alphabetic keys are arranged in a reduced-QWERTY layout.

5. The handheld wireless communication device as recited in claim 1, wherein said letters associated with said alphabetic keys are arranged in a QWERTZ layout.

6. The handheld wireless communication device as recited in claim 1, wherein said alphanumeric input keys comprise numeric keys having numerals associated therewith and wherein said associated numerals are arranged in a telephone keypad layout.

7. The handheld wireless communication device as recited in claim 1, wherein said elongate body is configured to be held in the hand of the operator with a long axis of said device substantially horizontally oriented during text entry.

8. The handheld wireless communication device as recited in claim 1, wherein said elongate body is configured to be held in the hand of the operator with a long axis of said device substantially vertically oriented during text entry.

9. The handheld wireless communication device as recited in claim 8, wherein said display is located in an upper portion of the front face of said elongate body during text entry, said key field is located in a lower portion of the front face of said elongate body during text entry and said navigation tool is located substantially between said key field and said display.

10. The handheld wireless communication device as recited in claim 1, wherein said navigation tool is at least partially surrounded by said key field.

11. The handheld wireless communication device as recited in claim 1, wherein a majority of said navigation tool is surrounded by said key field.

12. The handheld wireless communication device as recited in claim 1, wherein said navigation tool is a trackball.

13. The handheld wireless communication device as recited in claim 1, wherein at least one key of said key field is positioned adjacent to said navigation tool and said at least one key has a circular arc-shaped edge conformance fitting to a circular arc-shaped boundary about said navigation tool.

14. A handheld wireless communication device configured to send and receive text messages and configured to send and receive voice communications, said device comprising:
a hand cradleable, elongate body configured to be held in one hand by an operator of said device during text entry;
a display located on a front face of said elongate body and upon which information is displayed to the operator during text entry;
a key field located on the front face of said elongate body, said key field being composed of a plurality of keys selected from a plurality of alphanumeric input keys and at least one menu key;
a navigation tool located on the front face of said elongate body;
said alphanumeric input keys comprising a plurality of alphabetic keys having letters associated therewith and said letters being arranged in a traditional, non-ITU Standard E.161 layout;
a microprocessor configured to receive operator commands from said alphanumeric input keys, said menu keys and said navigation tool and to affect corresponding changes to the display;
said elongate body has a length greater than a width thereof and said display, said key field and said navigational tool are located in series along said length of said elongate body; and
a plurality of keys of said key field are substantially arranged in rows and columns, a top key in a column adjacent to the navigation tool has an edge conformance fitting to a boundary about the navigation tool and each key in that column is offset below the other keys in each associated row, with each key in the column adjacent to the navigation tool has substantially the same shape which is a different shape compared to the shape of keys in the other columns;
wherein at least one key of said key field is positioned adjacent to said navigation tool is a menu key that upon actuation displays an available action menu on said display, said at least one key has a circular arc-shaped edge conformance fitting to a circular arc-shaped boundary about said navigation tool and two call keys oppositely and laterally flank said navigation tool, one of said two call keys being a call initiation key and the other being a call termination key;
wherein said display, said navigational tool, and said key field are consecutively ordered along a lengthwise longitudinal-axis of said elongate body;
wherein said display, said navigational tool, and said key field are consecutively ordered along a lengthwise longitudinal-axis of said elongate body.

15. The handheld wireless communication device as recited in claim 14, wherein each of said display, said key field and said navigational tool is substantially width-wise centered on said elongate body.

16. The handheld wireless communication device as recited in claim 14, wherein said letters associated with said alphabetic keys are arranged in a QWERTY layout.

17. The handheld wireless communication device as recited in claim 14, wherein said letters associated with said alphabetic keys are arranged in a reduced- QWERTY layout.

18. The handheld wireless communication device as recited in claim 14, wherein said letters associated with said alphabetic keys are arranged in a QWERTZ layout.

19. The handheld wireless communication device as recited in claim 14, wherein said alphanumeric input keys comprise numeric keys having numerals associated therewith and wherein said associated numerals are arranged in a telephone keypad layout.

20. The handheld wireless communication device as recited in claim 14, wherein said elongate body is configured to be held in the hand of the operator with a long axis of said device substantially horizontally oriented during text entry.

21. The handheld wireless communication device as recited in claim 14, wherein said elongate body is configured to be held in the hand of the operator with a long axis of said device substantially vertically oriented during text entry.

22. The handheld wireless communication device as recited in claim 21, wherein said display is located in an upper portion of the front face of said elongate body during text entry, said key field is located in a lower portion of the front face of said elongate body during text entry and said navigation tool is located substantially between said key field and said display.

23. The handheld wireless communication device as recited in claim 14, wherein said navigation tool is at least partially surrounded by said key field.

24. The handheld wireless communication device as recited in claim 14, wherein a majority of said navigation tool is surrounded by said key field.

25. The handheld wireless communication device as recited in claim 14, wherein said navigation tool is a trackball.

26. The handheld wireless communication device as recited in claim 14, wherein at least one key of said key field is positioned adjacent to said navigation tool and said at least one key has a circular arc-shaped edge conformance fitting to a circular arc-shaped boundary about said navigation tool.

\* \* \* \* \*